US006912530B1

(12) United States Patent
Hanson et al.

(10) Patent No.: US 6,912,530 B1
(45) Date of Patent: Jun. 28, 2005

(54) SPECIAL DEVICE ACCESS TO DISTRIBUTED DATA

(75) Inventors: Charles Albin Hanson, Shoreview, MN (US); Thomas Winston Johnson, Stillwater, MN (US); Carol Jean O'Hara, Prior Lake, MN (US); Koon-yui Poon, Lynnwood, WA (US); Roger Anthony Redding, Bellevue, WA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/495,492

(22) Filed: Feb. 1, 2000

(51) Int. Cl.[7] .............................................. G06F 17/30
(52) U.S. Cl. ...................................................... 707/10
(58) Field of Search .............................. 707/10, 103 R, 707/103, 103 Y, 103 Z, 526, 102; 345/501, 700; 709/201, 202

(56) References Cited

U.S. PATENT DOCUMENTS

| 5,414,809 | A | * | 5/1995 | Hogan et al. ................ 345/765 |
| 5,600,778 | A | * | 2/1997 | Swanson et al. ............. 345/762 |
| 5,603,034 | A | * | 2/1997 | Swanson ..................... 717/111 |
| 5,826,025 | A | * | 10/1998 | Gramlich .................... 709/217 |
| 6,169,991 | B1 | * | 1/2001 | Tsukahara ................... 707/102 |
| 6,256,620 | B1 | * | 7/2001 | Jawahar et al. ................ 707/2 |
| 6,262,734 | B1 | * | 7/2001 | Ishikawa .................... 345/850 |
| 6,356,905 | B1 | * | 3/2002 | Gershman et al. ............ 707/10 |
| 6,470,381 | B2 | * | 10/2002 | De Boor et al. ............. 709/217 |
| 6,643,652 | B2 | * | 11/2003 | Helgeson et al. ............. 707/10 |
| 6,690,390 | B1 | * | 2/2004 | Walters et al. .............. 345/705 |

* cited by examiner

Primary Examiner—Greta Robinson
(74) Attorney, Agent, or Firm—Beth L. McMahon; Mark T. Starr; Lise A. Rode

(57) ABSTRACT

Methods are executed upon data objects distributed across a plurality of nodes of a system from a user-held "special" device (such as a cell phone, palm top, set top, car GPS system, . . . ). Heterogeneous data at a plurality of remote nodes is accessed automatically in parallel at high speed using a simple script request containing a data source object name wherein the heterogeneous data is treated as a single data source object, the script further containing code representing a user-defined program to be executed on the data source object. An agent breaks the user-generated script into new scripts appropriate for execution at the remote nodes. A messenger process transmits the new scripts to the appropriate remote nodes where respective agent processes respond to automatically access the appropriate data and to automatically execute the specified program. If the program is a user-defined script or executable, the respective agent processes access a metadata repository to obtain the specified program. A set of complex transactions may be built up and executed by simply touching or updating the special device screen, according to a visual methodology in which the results of each sub-transaction are displayed and become the basis for the next point and touch operation in the sequence of transactions.

13 Claims, 35 Drawing Sheets

SPECIAL DEVICE ACCESS TO DISTRIBUTED DATA

FIELD OF THE INVENTION

The subject invention relates generally to data processing and more particularly to a method and apparatus providing employing simple point and touch operations to achieve high speed parallel accessing of data stored at a number of remote heterogeneous sites and automatic execution of selected methods on such data.

BACKGROUND OF THE INVENTION AND RELATED ART

Present technology is witnessing the development of large remote databases or "data warehouses", as well as rapid expansion of the Internet and proliferation of corporate intranets. Demand is growing for increasingly large and rapid data transfers involving streaming video, visualization graphics and large data warehouse downloads over such new network protocols as the Fast Ethernet and Gigabyte Ethernet. The data which it would be desirable to access may be stored across heterogeneous sites, i.e., sites which contain different types of database systems or other data containers. Hence the data which may need to be accessed may be referred to as "heterogeneous data.". At the same time, data processing and computer capabilities are being built into numerous special devices such as cell phones, palm tops, set tops and car-based GPS computers. Thus, special devices are of a kind whose primary role is not thought of as full scale computing, in contrast to lap-top computers and personal computers.

Our co-pending application, U.S. Ser. No. 09/405,038 filed Sep. 24, 1999, incorporated by reference herein and entitled Method And Apparatus For High Speed Parallel Accessing And Execution of Methods Across Multiple Heterogeneous Data Sources discloses the accessing of distributed data contained in a number of distributed heterogeneous data sources via a search initiated by a single Java script wherein a single object represents the data to be retrieved and subjected to a method in the script. It has occurred to the inventors that provision of such accessing capabilities to special devices would provide a highly useful and powerful enhancement to such devices.

SUMMARY OF THE INVENTION

According to the invention, so-called "special devices" such as palm tops, set tops, cell phones, and car-based GPS computers are provided with the capability to access heterogeneous data stored across the World Wide Web, Internet, or other networks where such networks are treated as a large virtual dataserver or warehouse. According to one embodiment, an ActiveX component is e-mailed to the special device. The ActiveX component contains both a user interface and agent-based software similar to that of the aforementioned pending application. When the user clicks on the ActiveX control, a pull-down menu on the special device display lists the available data objects, each of which may include heterogeneous datasources distributed across a worldwide network. The user then selects an object of interest. In response, a second pull-down menu lists the methods that may be run against that object. The user then clicks on one of the methods (e.g., search, sort, compute . . . ). If the data is distributed, the method is run in parallel across the distributed data.

As will be apparent, various other transactions may be implemented via the special device display according to the invention in addition to accessing data objects and executing methods upon them. Thus, special device users can access the Internet and perform more sophisticated calculations, algorithms and transactions (e.g., comparing prices and/or features according to various algorithms), and can construct those transactions with simple point and click or point and touch operations.

Other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its many details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

Figure 1:
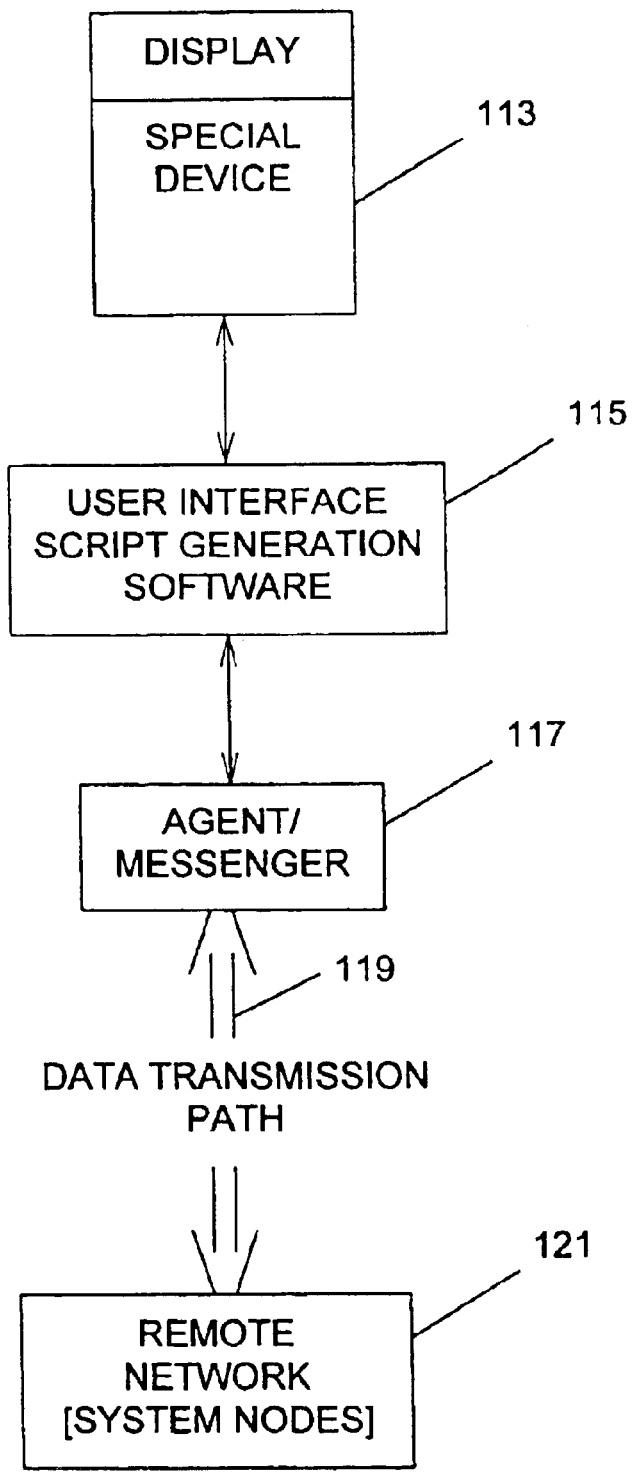
FIG. 1 is a system block diagram illustrating implementation of the preferred embodiment of the invention.

DETAILED DESCRIPTION OF ONE EMBODIMENT:

FIG. 1 schematically illustrates apparatus according to the preferred embodiment. A special device hardware input/output interface 113 ("special device") operates under control of user interface and script generation software 115. The special device 113 may be, for example, a conventional touch screen and stylus of a palm-held device, which displays graphics and enables function selection by touching various icons and other indicia on the screen. The user interface software 115 provides the screen displays and interface capability, as well as the capability to translate certain screen selections into script that is recognized by an agent/messenger code module 117. The agent/messenger code module 117 is constructed as described in the aforementioned patent application to respond, for example, to a request for execution of a method upon a data object to send appropriate scripts through a datatransmission medium 119 such as the internet to those nodes in a system 121 where the data object resides in order to cause automatic execution of the method at the nodes upon heterogeneous data and to cause automatic return of the results to the special device 113. The construction and operation of the graphical user interface and the software implementing it will now be described in more detail by reference to FIGS. 2 to 22, which show illustrative examples of operation according to the preferred embodiment.

Figure 2:
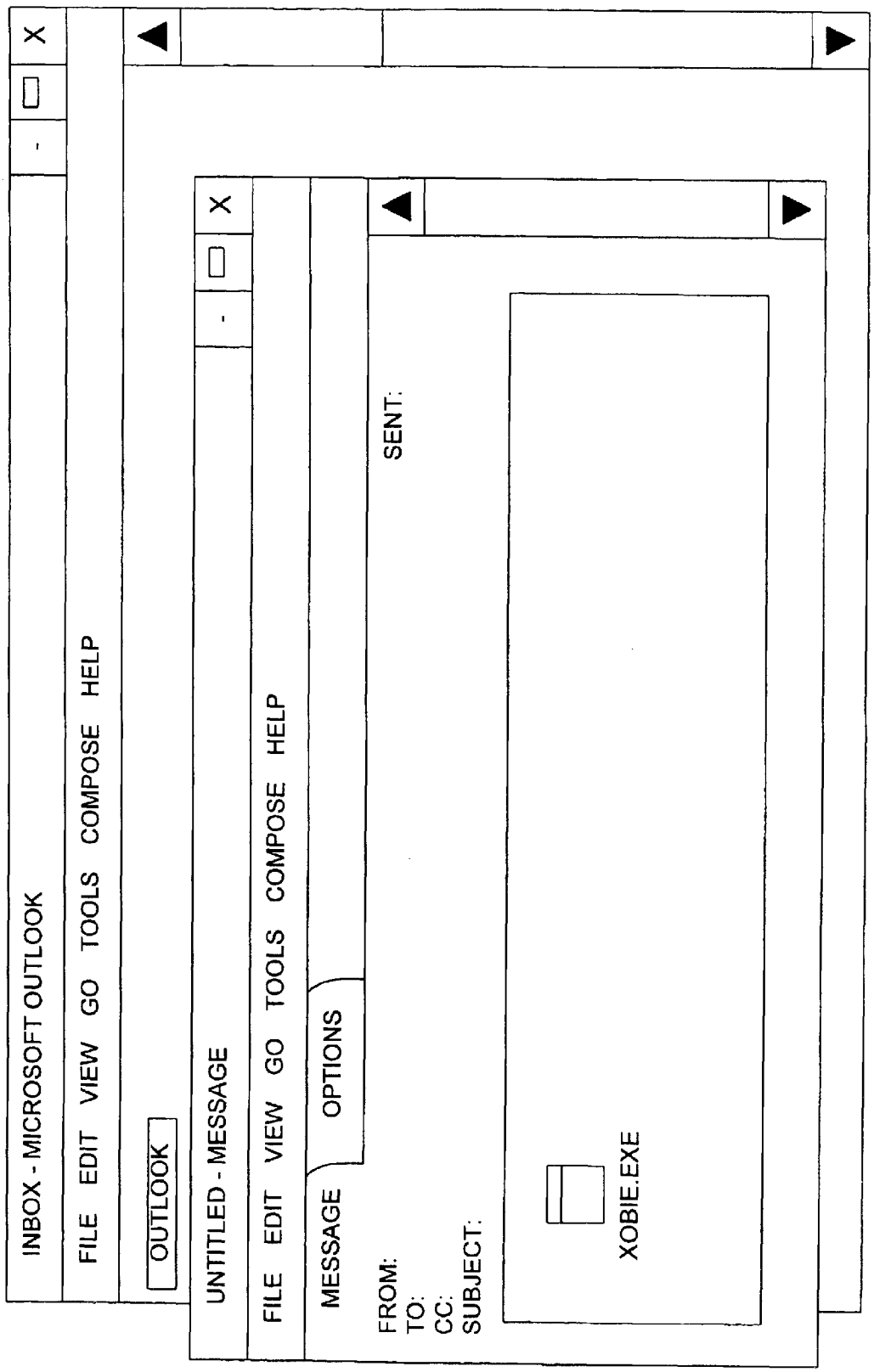
FIG. 2 is a computer screen display illustrating a first display generated according to the preferred embodiment.

According to the preferred embodiment, a software component including the graphical user interface to be displayed and the agent/messenger code module 117 is transmitted to the special device 113. FIG. 2 illustrates an e-mail of such software in the form of an executable element identified as "XOBIE.exe". On clicking "XOBIE.exe", an installation script is executed, which creates a set of directories, and copies to them an ActiveX control, denoted XOBIE.ocx, and a Visual Basic executable, denoted project20.exe. The ActiveX control, XOBIE.ocx, contains the apparatus otherwise referred to as the messenger and agent code. The Visual Basic executable is a Visual Basic front end Graphical User Interface (GUI) application, typical screens of which are illustrated in the examples included hereafter. Clicking the XOBIE.exe icon causes two results: (1) the installation of the Visual Basic executable and the XOBIE.ocx ActiveX control (the apparatus) on the special device, and (2) the execution of the Visual Basic executable which displays the screen shown in FIG. 3 (a graphical user interface denoted as "JOBIE").

Another method of supplying software 115 to the special device 113 is to have a browser on the special device invoke an ActiveX control from a web page displayed in the browser, which automatically downloads that control from a server. Another approach is to interact with so-called active server pages on a remote server such that all the interpretation and invocation of the "apparatus" is done from the remote server end. This results in a "thin" client, i.e., very little code actually residing on the special device 113. The approach under discussion involves having the agent/messenger processes on the "Client", i.e., the special device 113.

Figure 3:
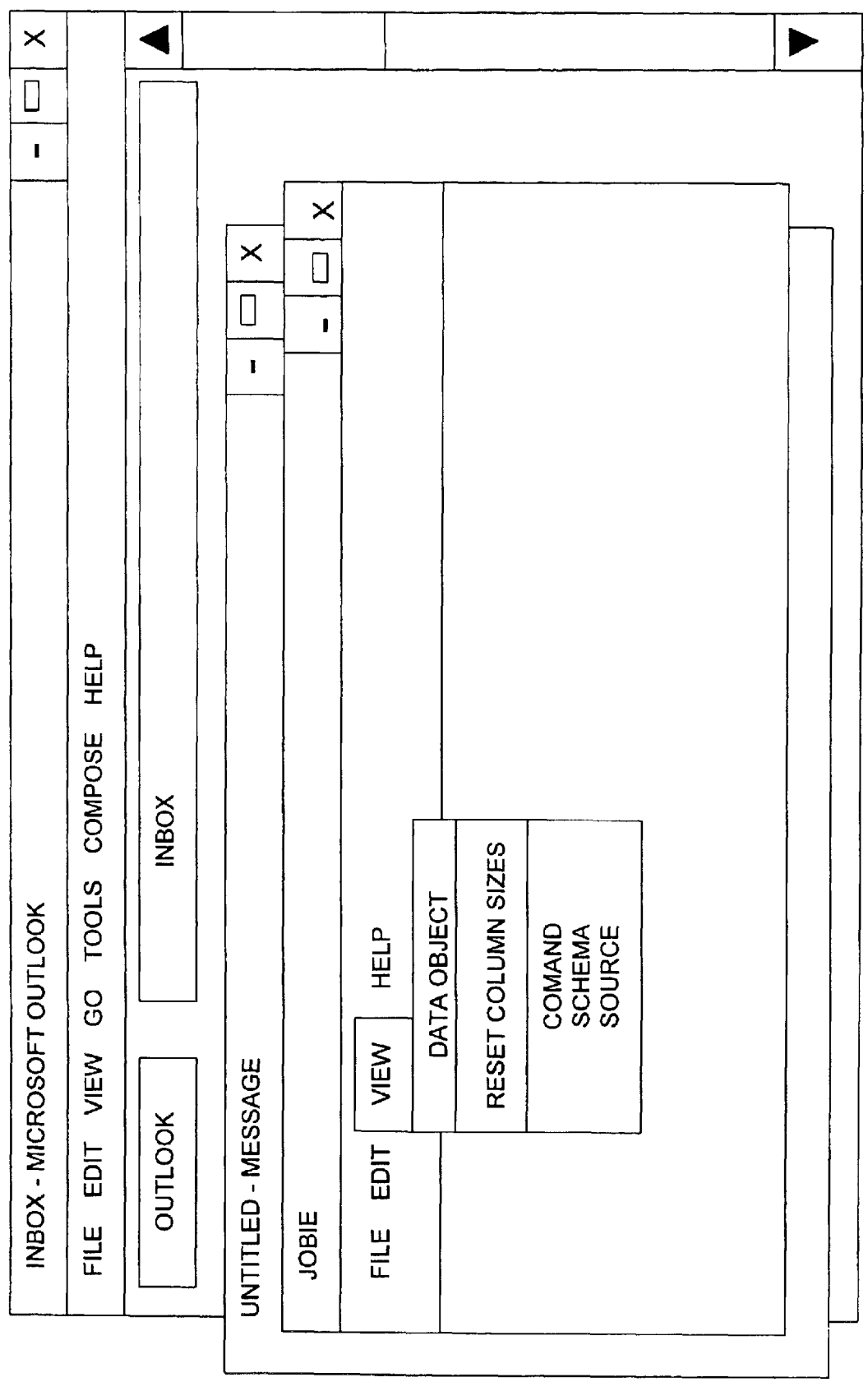
FIG. 3 is a second computer screen display illustrating a first display generated according to the preferred embodiment.

With respect to FIG. 3, the JOBIE graphical user interface provides a number of user selectable commands, which, on a typical special device 113, are selected by a stylus. Such commands may also be selected by clicking on a selected icon if a mouse environment is provided. In FIG. 3, the user has selected VIEW, which provides a plurality of options. These options include DATA OBJECTS, which, when clicked-on or touched, provides a list of the available data objects. A repository, described further below, contains a pointer to a "federation file" which identifies the servers in the federation. The metadata contains, for each server, the data source objects residing in that server. On selecting DATA OBJECTS from the VIEW menu, the GUI generates the command objects ( ).display ( )

which results in a scan of the above metadata via the messenger/agent 117 to list all the data source objects available in the servers of the federation. Thus, the data information, i.e., a list of all the data objects named in the Federation 121 is returned to the Visual Basic (GUI) front end, which displays the information shown in FIG. 4.

Figure 4:
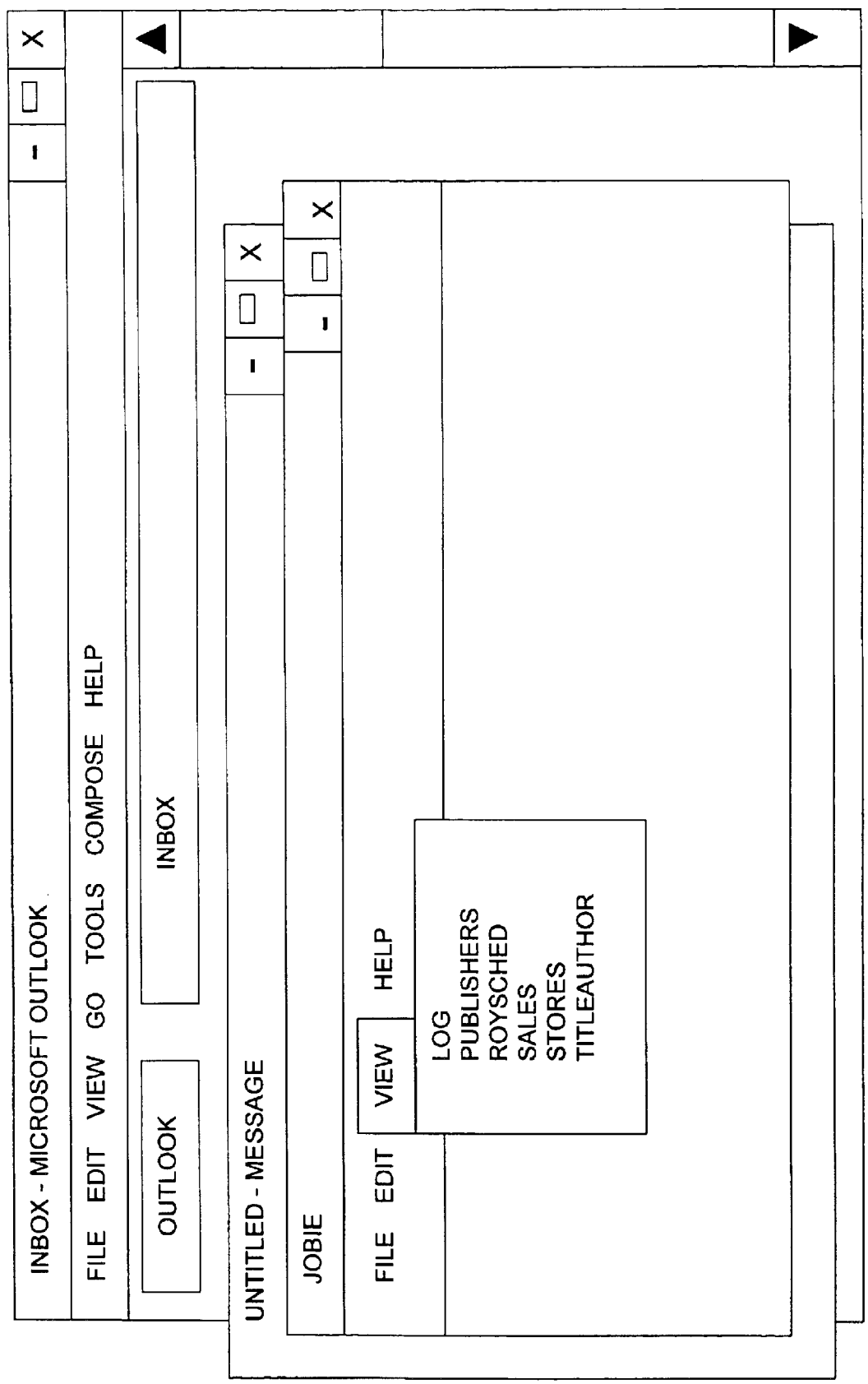
FIG. 4 is a third computer screen display illustrating a first display generated according to the preferred embodiment.

According to FIG. 4, the available data source objects are identified as "log," "publishers," "roysched," "sales," "stores" and "title author."

Figure 5:
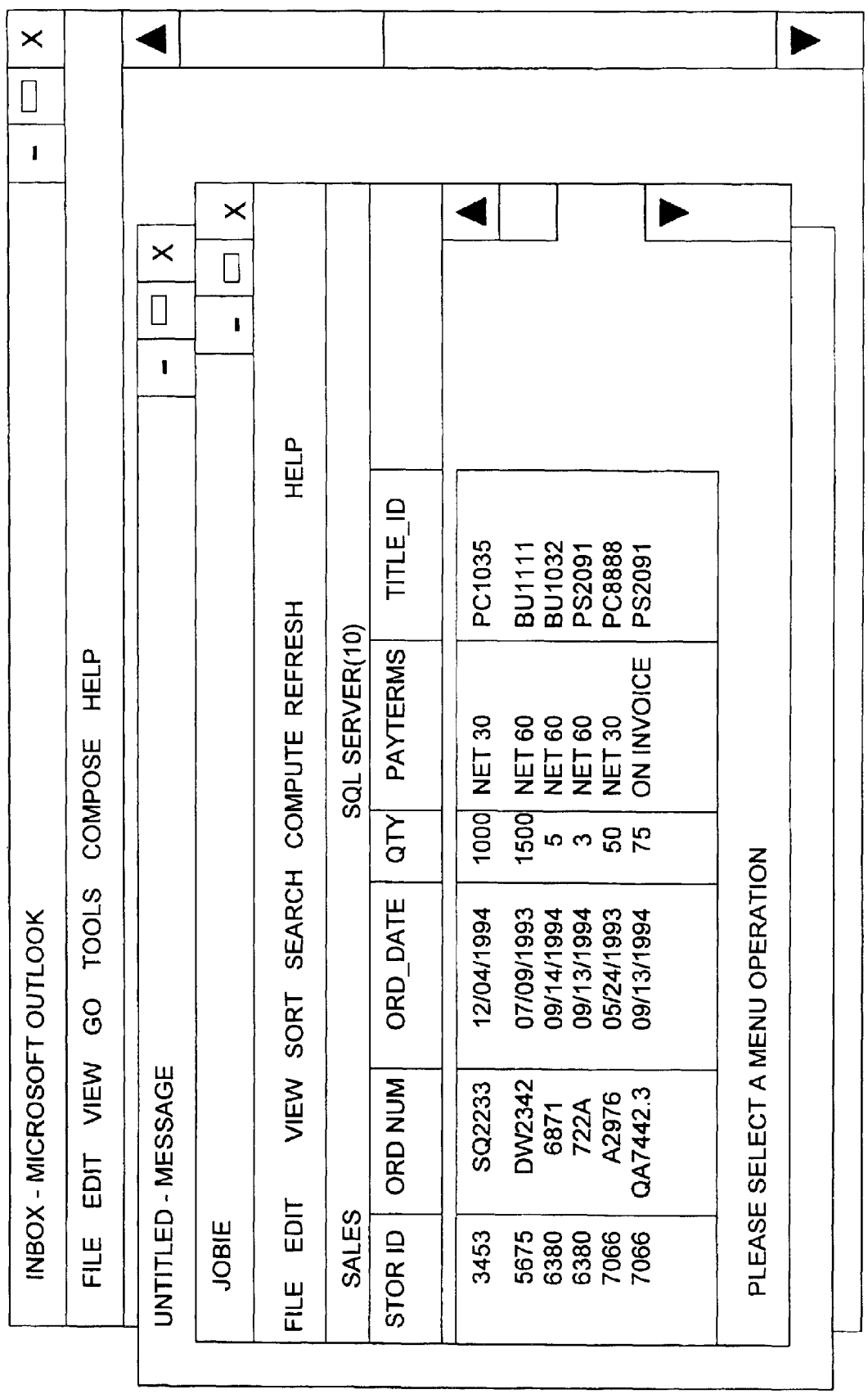
FIG. 5 is a fourth computer screen display illustrating a first display generated according to the preferred embodiment.

FIG. 5 illustrates a typical result of selecting the "sales" data object. Such selection results in retrieval of the data corresponding to the data object from its storage locations across the network 121 and display of the data on the display of the special device 113. According to the example of FIG. 5, columns of data are displayed, the columns comprising a store i.d. code, a corresponding order number, the date of the order, the quantity ordered, the payment terms and the product code ("title-id") identifying the particular product ordered.

To implement the above action, code is provided in the GUI which responds to selection of the "sales" object to automatically generate the appropriate script command to the agent/messenger on the special device, which then transmits the script command to the servers which contain the data object of interest. A command of the sort:

sales.display (10)

results in display the first ten records of the "sales" object (i.e., provide this information to the Visual Basic GUI front end to perform this display). Additionally, selection of the "sales" object causes generations of a "sales.meta info" command, which results in return of metadata corresponding the "sales" object to the special device as discussed in further detail below.

Figure 6:
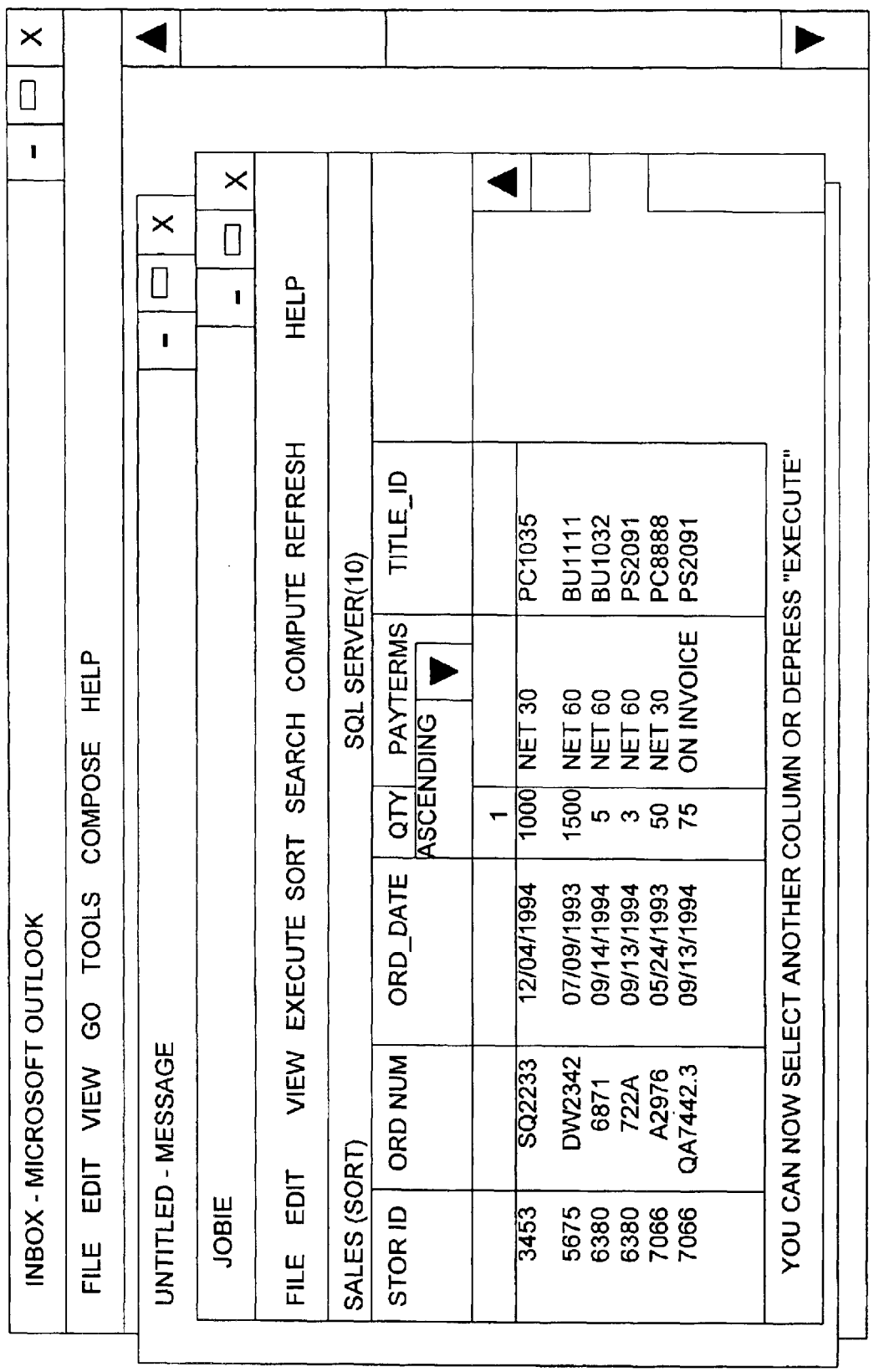
FIG. 6 is a fifth computer screen display illustrating a first display generated according to the preferred embodiment.

It will be noted that the screen display of FIG. 5 includes a number of user-selectable methods such as "sort," "search" and "compute," which may be invoked on the data. In FIG. 6, the "sort" method has been selected. To conserve special device memory, the "sort" is performed at the nodes containing the data. A command "sales.sort (qty(d), 10)" results in the sales object being sorted on the "qty" column in descending order. The sort is performed at the node(s) containing the data. The "10" indicates that the first ten records of the result should be returned, initially, to the requester. If the data is distributed, the sort is performed automatically in parallel, as discussed in more detail in connection with FIGS. 23–27. The command sent to the appropriate remote servers by the ActiveX control on the client (special device) is of a type which requests a number of records based on the available storage in the special device. "Display (10)" or "sort(qty(d), 10)" are examples of such commands.

Figure 7:
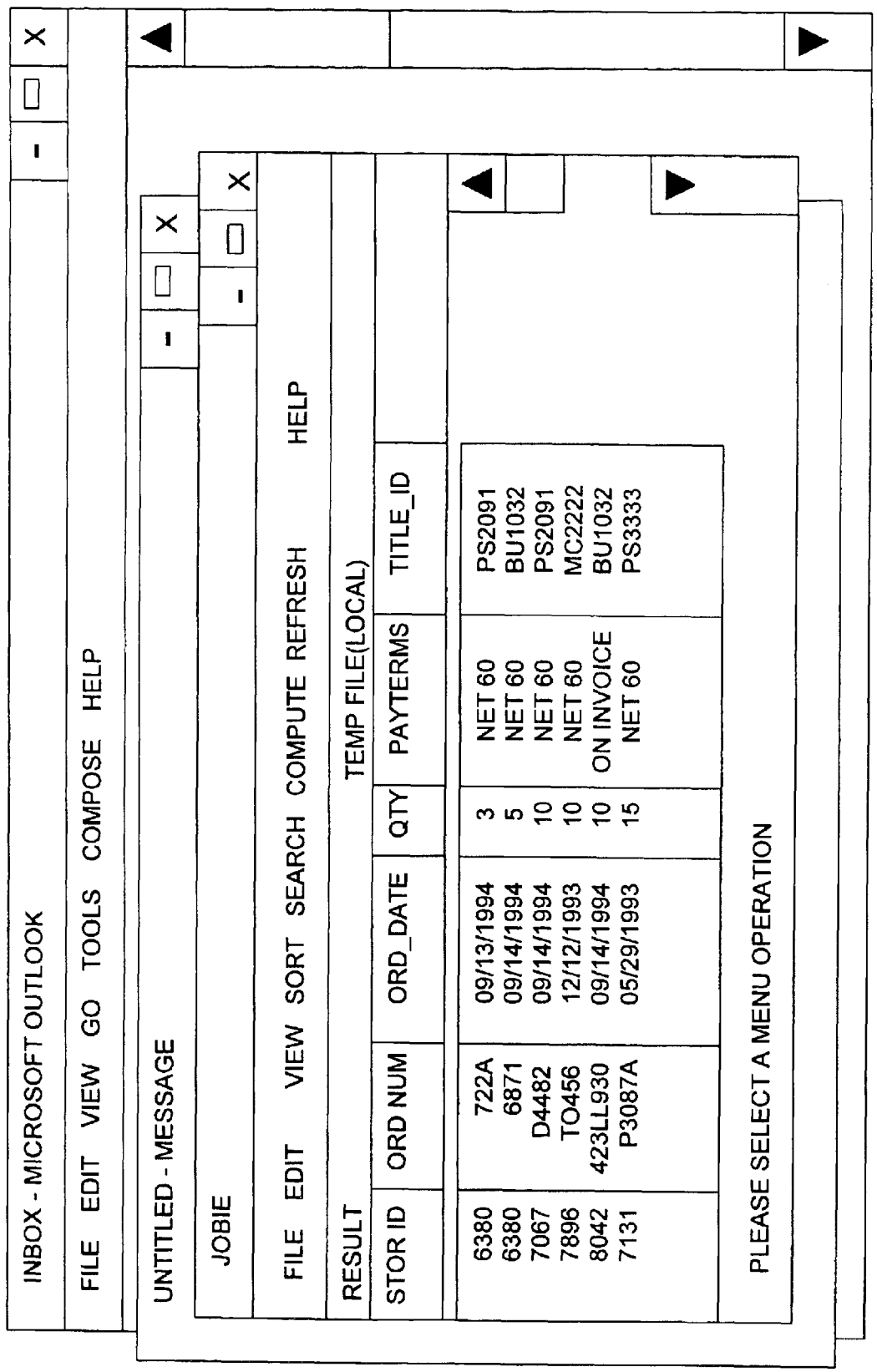
FIG. 7 is a sixth computer screen display illustrating a first display generated according to the preferred embodiment.

With respect to FIG. 6, once the "sales (sort)" screen appears, the user clicks on the particular column or columns to be sorted and a window opens displaying a number of options such as "ascending" or "descending." In FIG. 6, "ascending" is selected and the user then selects (clicks on) EXECUTE. The GUI agent/messenger software responds by transmitting a sales-sort script with any newly selected properties to the servers where the data object resides. FIG. 7 shows the result of the EXECUTE, which is a display of the data ordered by ascending quantity of units ordered. Thus, according to the preferred embodiment, transactions may be built up by a simple point and touch approach.

Figure 8:
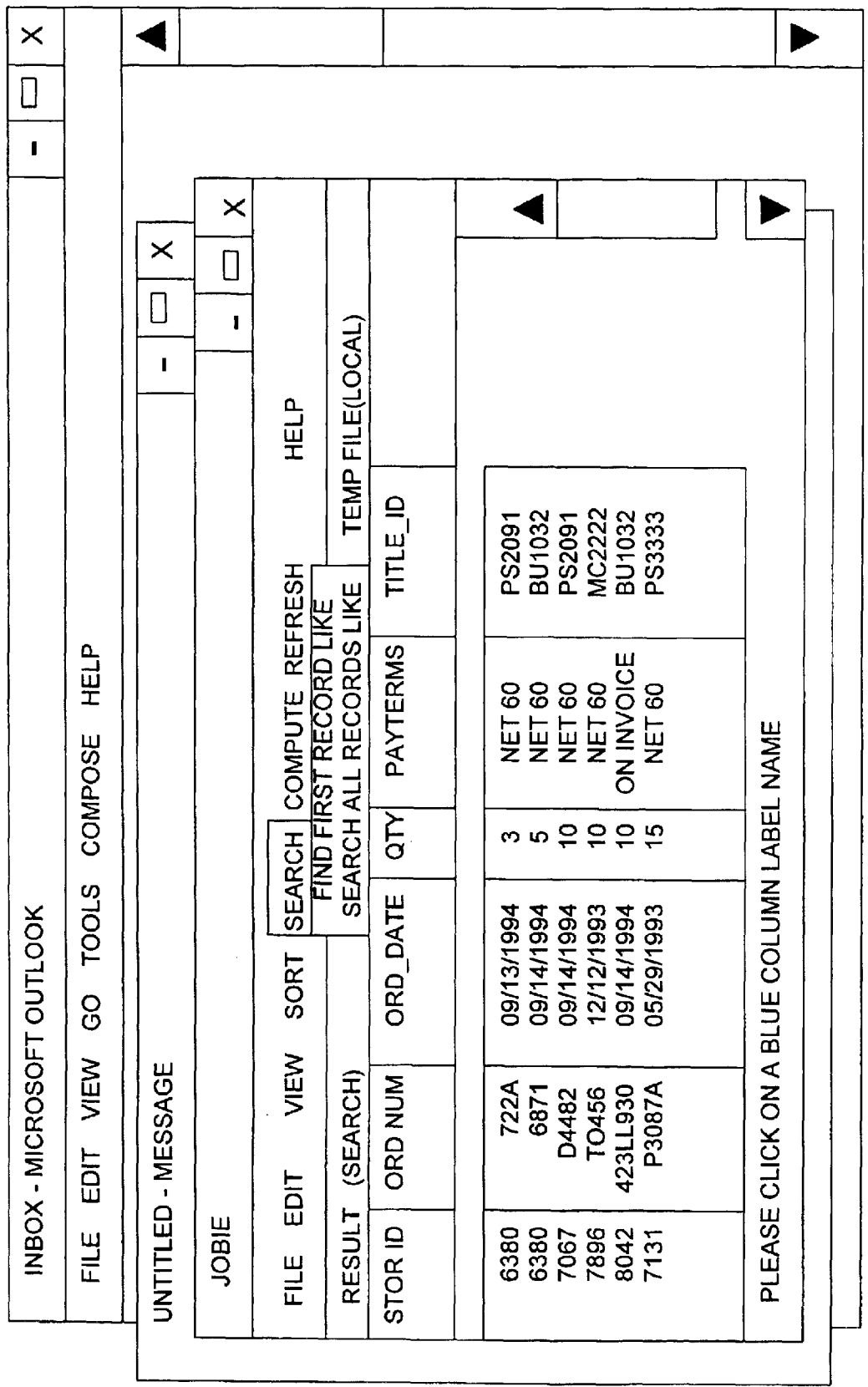
FIG. 8 is a seventh computer screen display illustrating a first display generated according to the preferred embodiment.

Accordingly, FIG. 8 illustrates further performance of a SEARCH on the results of FIG. 7. Touching (or clicking on) SEARCH results in display of options including "Find First Record Like" one about to be selected by the user on the screen of FIG. 8. In the example under discussion, a search for all possible records is selected by touching "Search All Records Like." Then one of the column label names is touched, prompted by the screen instruction "Please click on blue column label here."

Figure 9:
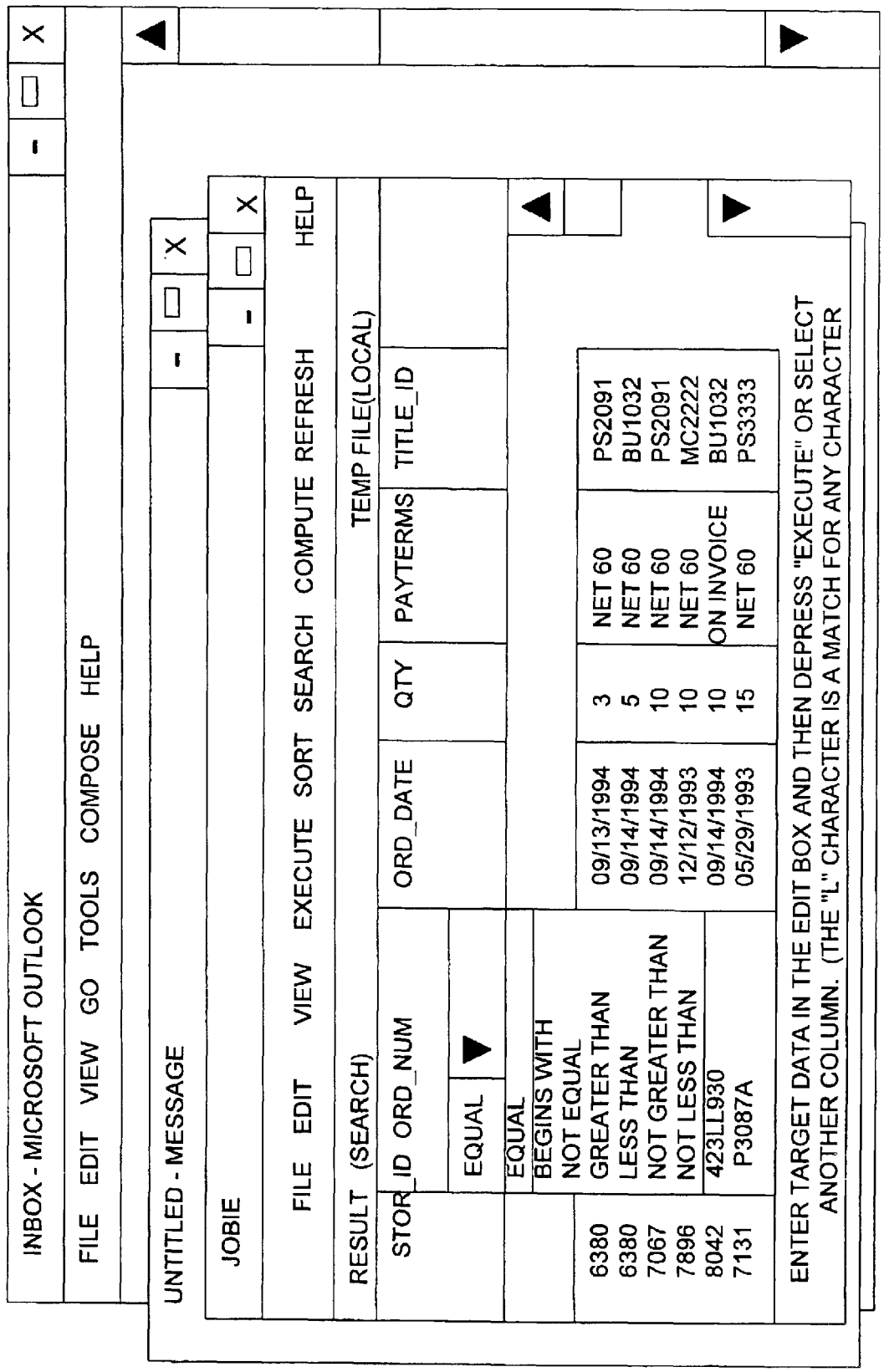
FIG. 9 is an eighth computer screen display illustrating a first display generated according to the preferred embodiment.
Figure 10:
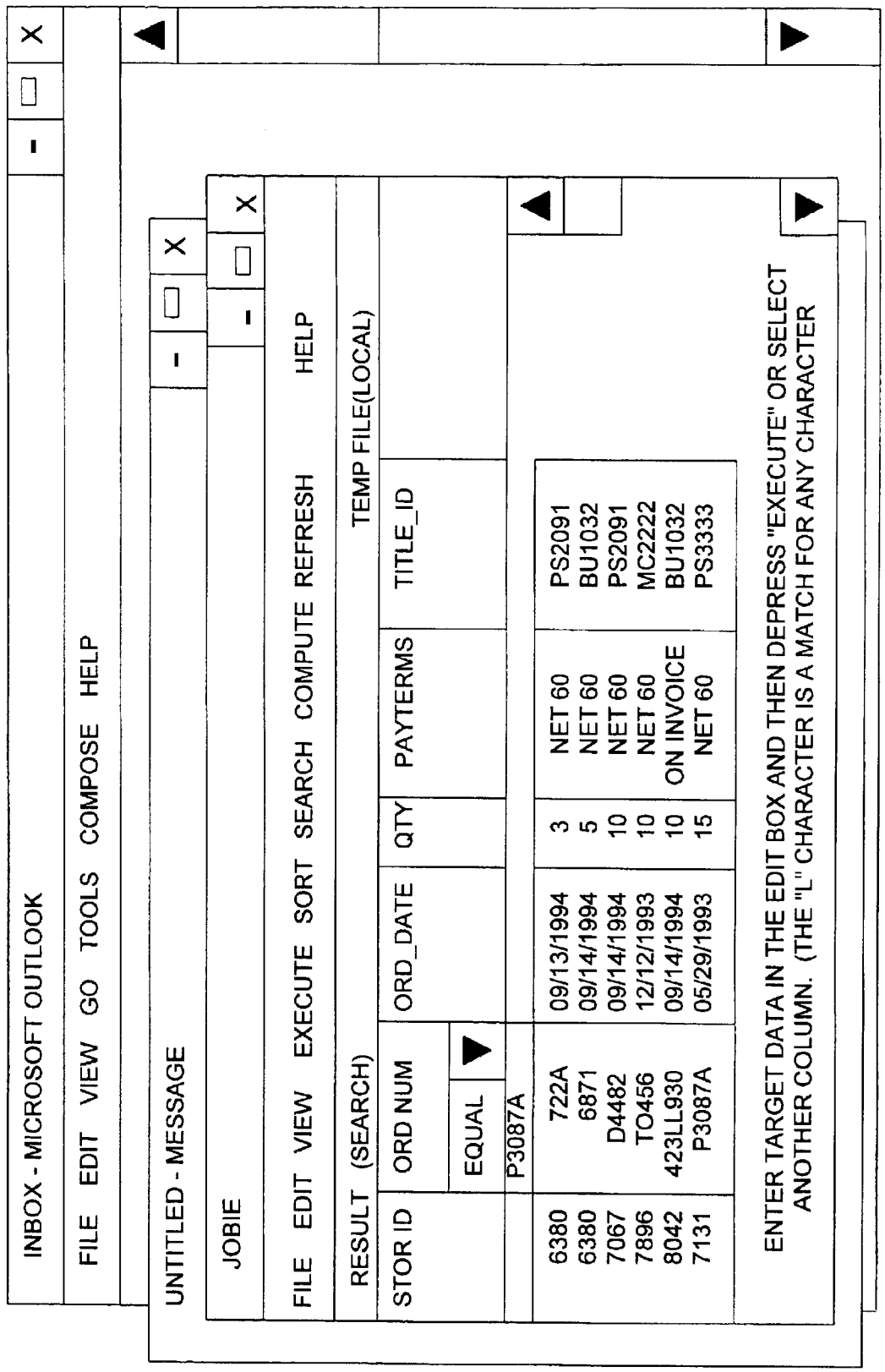
FIG. 10 is a ninth computer screen display illustrating a first display generated according to the preferred embodiment.

As shown in FIG. 9, the order number column has been touched, with a resultant drop-down display of a number of search criteria. FIGS. 9 & 10 illustrate selection of "equal" and the entry of target data, in this case order number P3087a, in the edit box (the search target, order number P3087a, is indicated by simply touching the edit box (the search target, order number P3087a, is indicated by an example of that order number on the screen). This shows how statements (transactions) of the sort:

sales.sort (qty)

this.search (if ord$_{13}$num="P3087a")

client.write (this)

have been constructed with simple point and touch operations.

Figure 11:
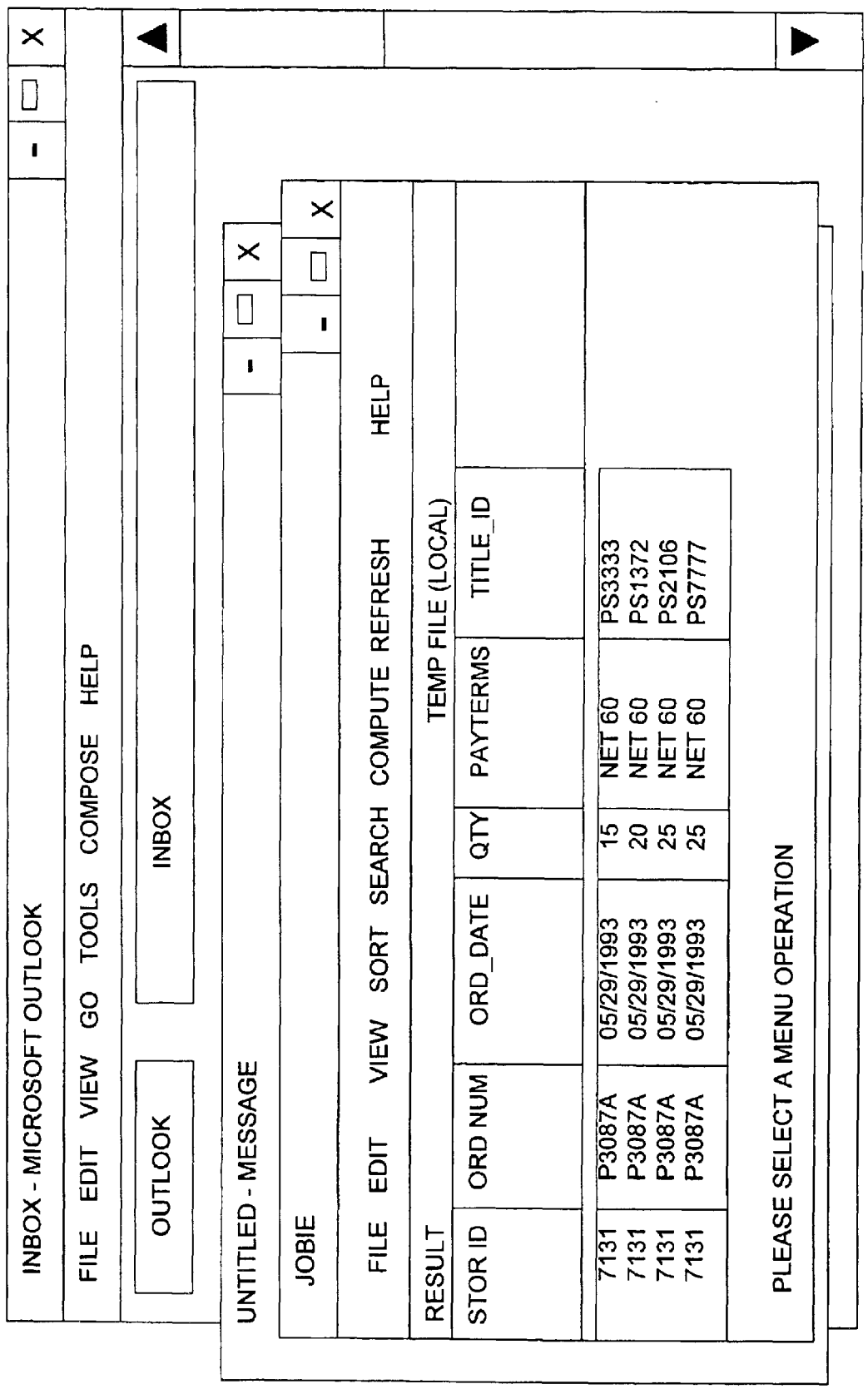
FIG. 11 is a tenth computer screen display illustrating a first display generated according to the preferred embodiment.

Selection of EXECUTE then produces the screen display of FIG. 11, which lists the information for all order numbers P3087a residing in the system. Thus, a sort and search across distributed heterogeneous data has been conducted solely by point and touch operations. Searches and sorts of multiple columns can be conducted at the same time.

Figure 12:
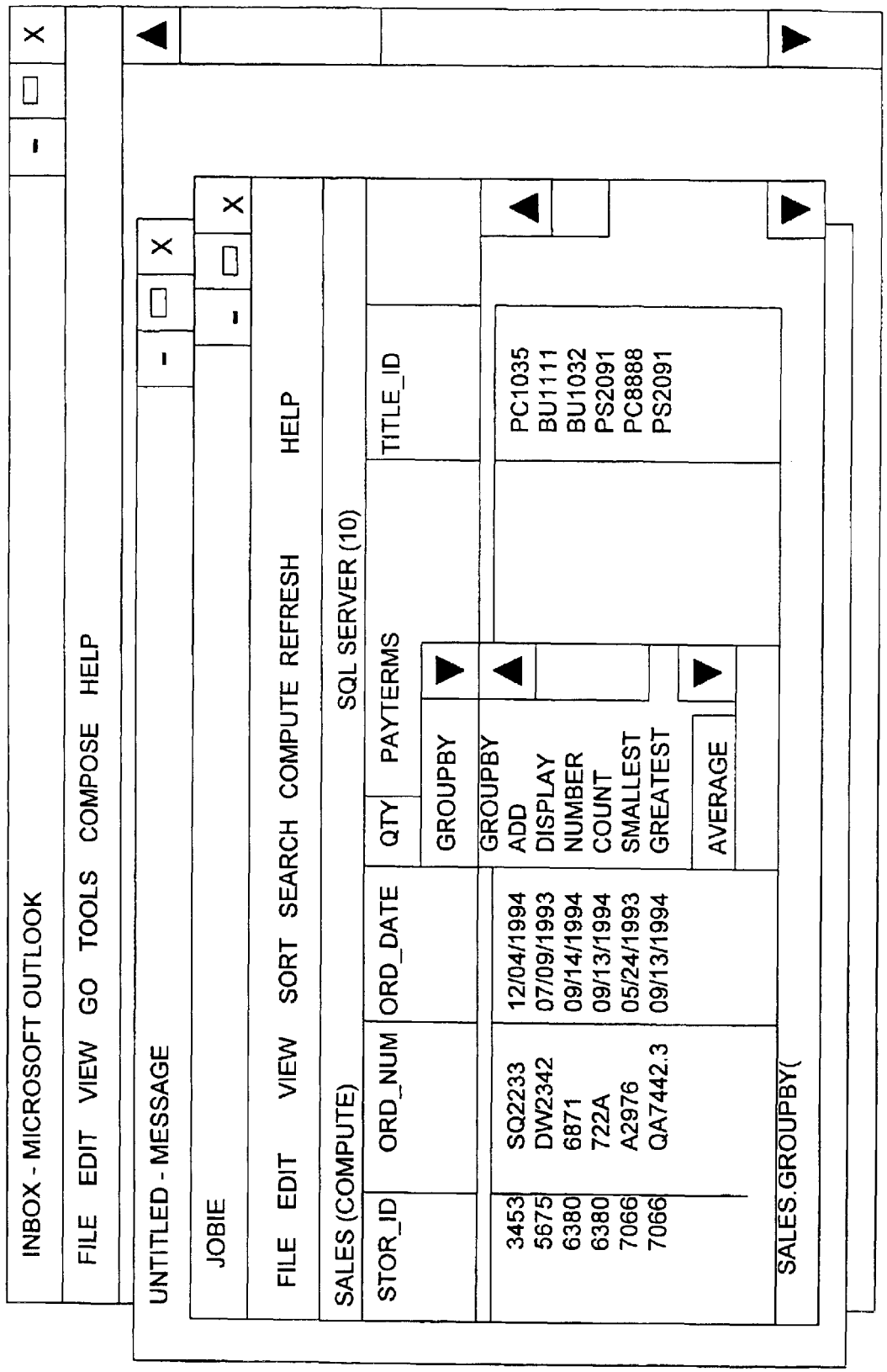
FIG. 12 is an eleventh computer screen display illustrating a first display generated according to the preferred embodiment.
Figure 13:
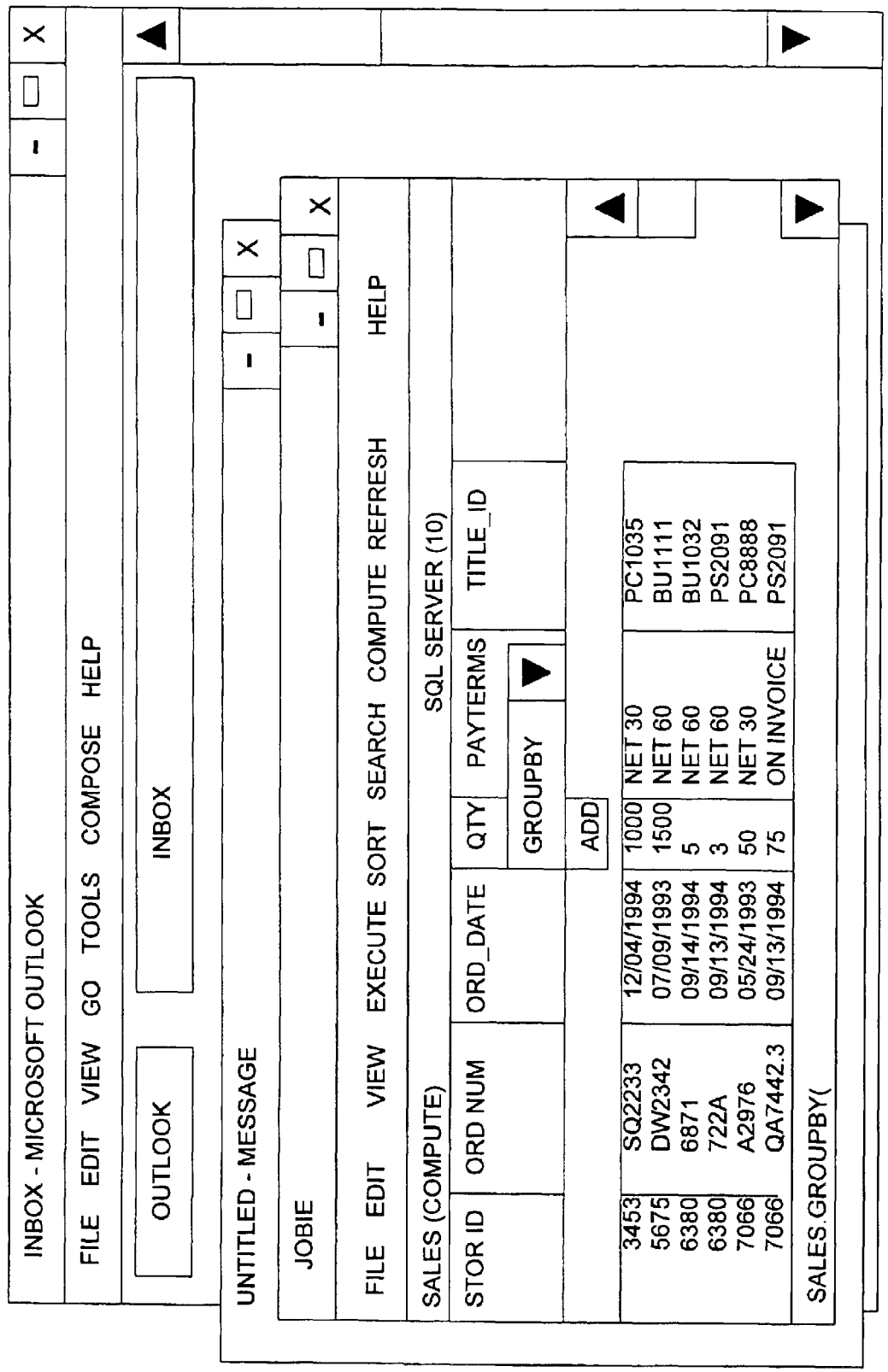
FIG. 13 is a twelfth computer screen display illustrating a first display generated according to the preferred embodiment.
Figure 14:
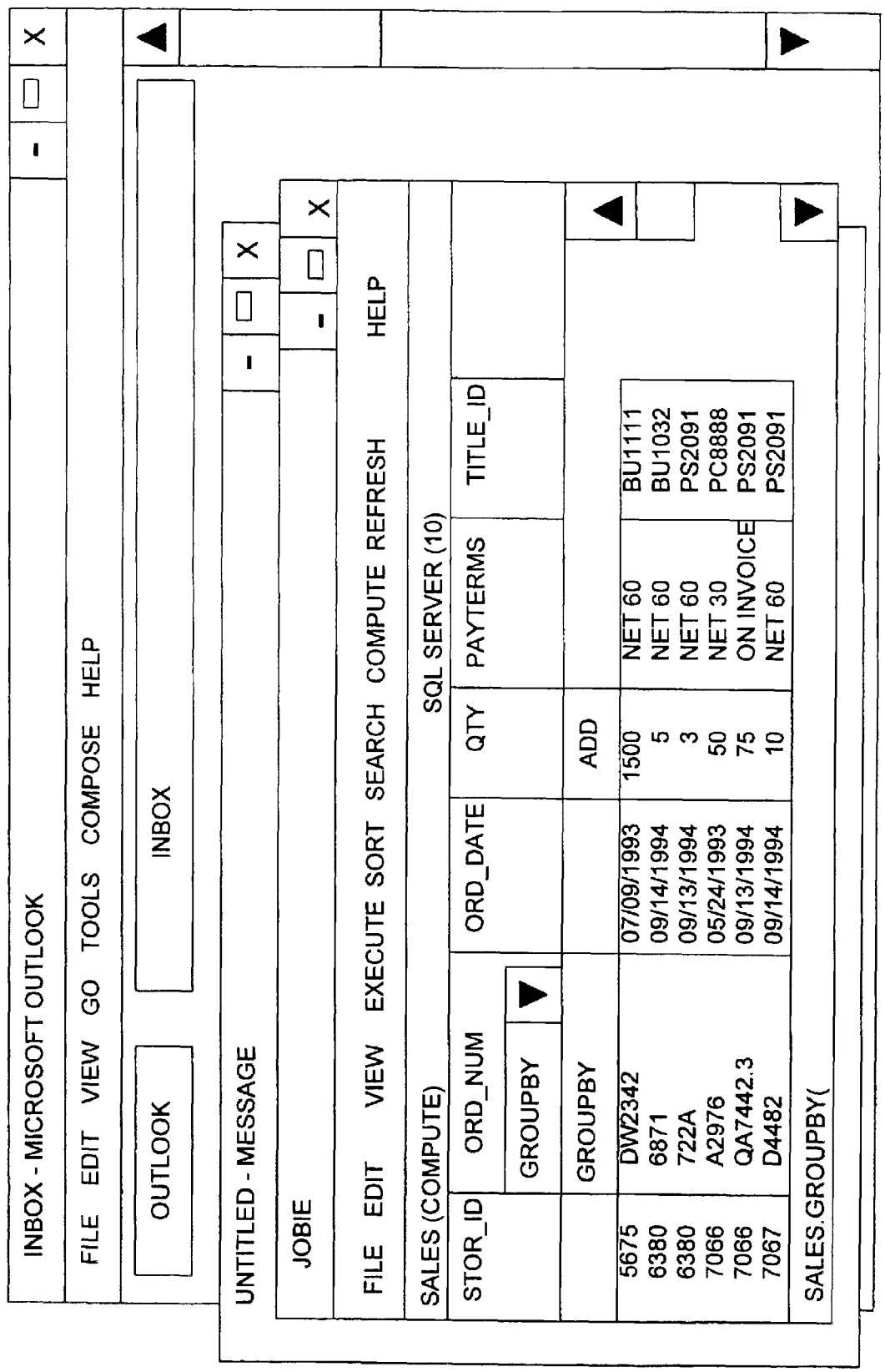
FIG. 14 is a thirteenth computer screen display illustrating a first display generated according to the preferred embodiment.
Figure 15:
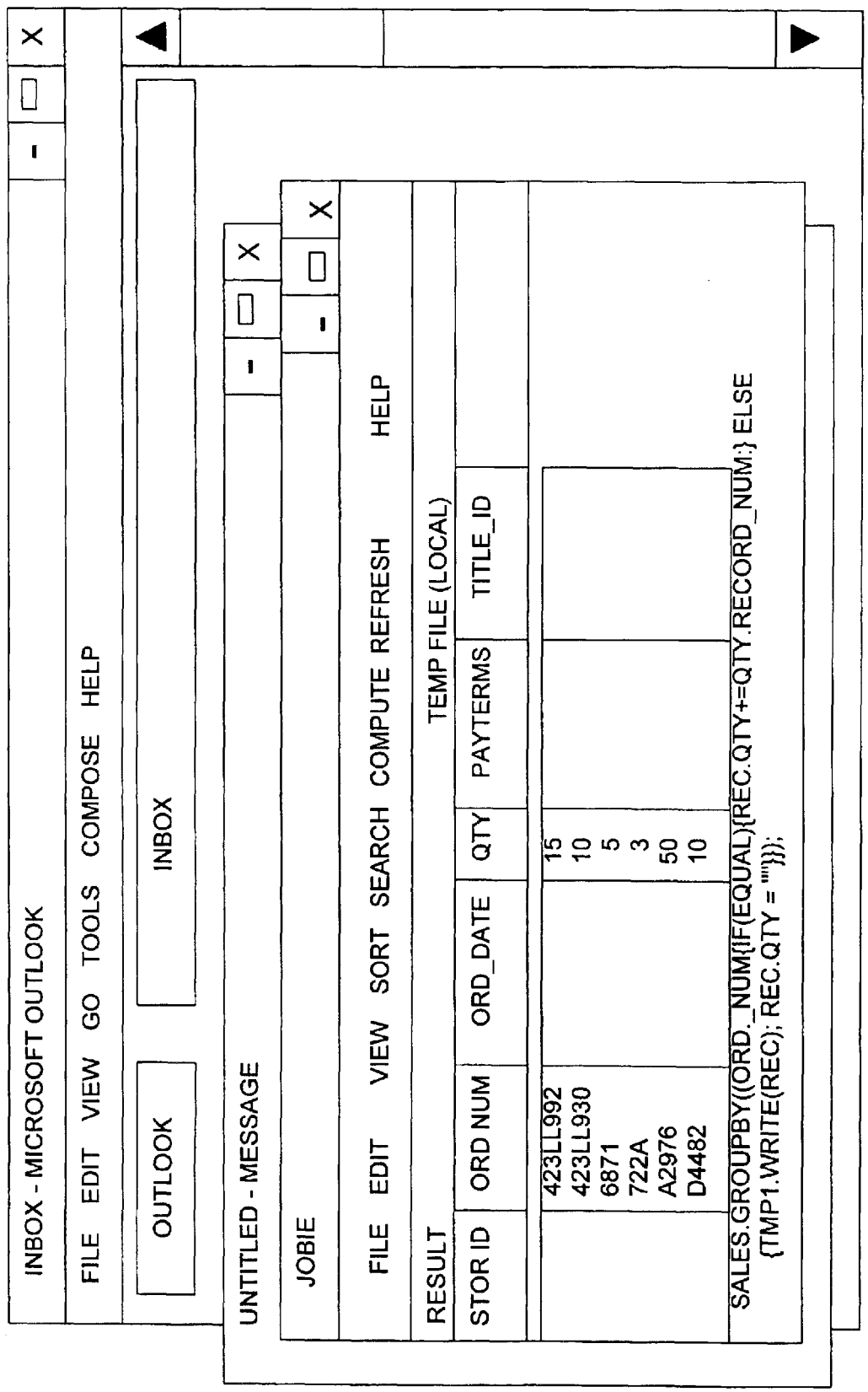
FIG. 15 is a fourteenth computer screen display illustrating a first display generated according to the preferred embodiment.
Figure 16:
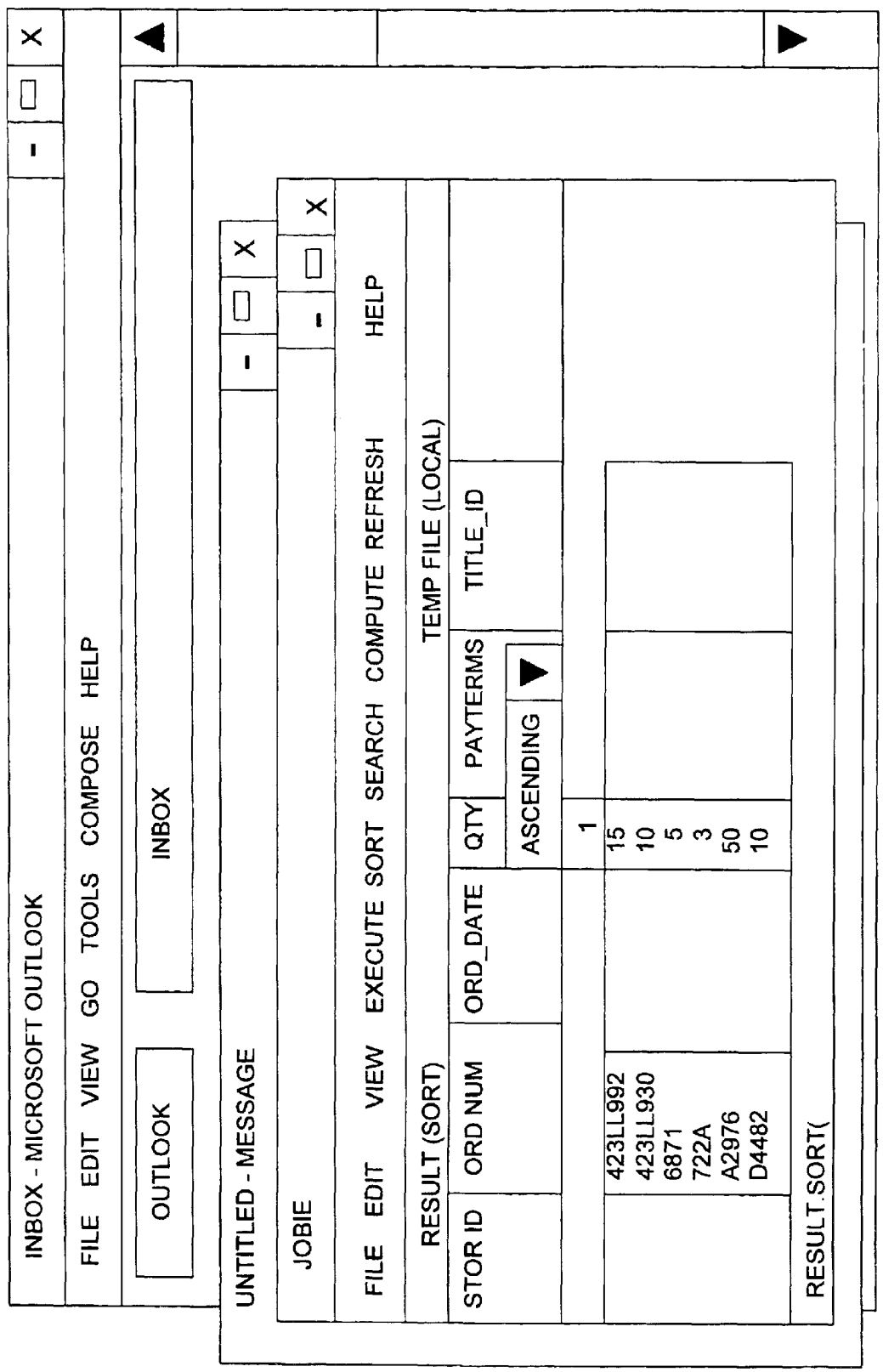
FIG. 16 is a fifteenth computer screen display illustrating a first display generated according to the preferred embodiment.
Figure 17:
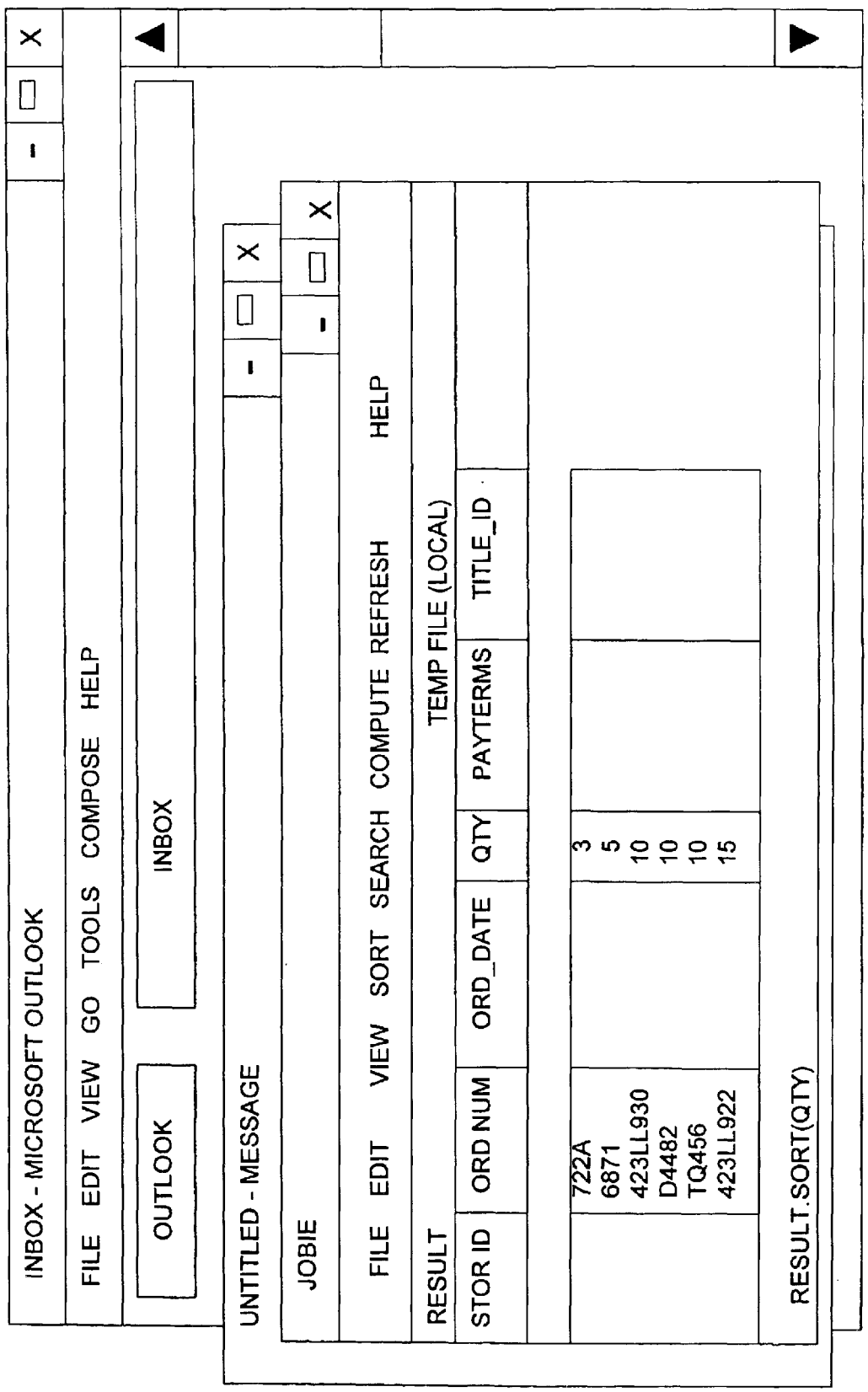
FIG. 17 is a sixteenth computer screen display illustrating a first display generated according to the preferred embodiment.

FIG. 12 illustrates a compute method performed on the "sales" object. Compute is illustrated being performed on the "quantity" column, with resultant display of a number of options such as "group by," "add," "count," select "smallest," etc. Selection of "group by" in the "order number" column, and "add" in the "qty" column, as reflected in FIG. 13 and FIG. 14, results in summing up the total quantity of each order number, which is ultimately displayed as shown in FIG. 15. FIG. 16 and FIG. 17 then illustrate performance of a sort by ascending quantity of the results of the "group by" an "add" operation.

Figure 18:
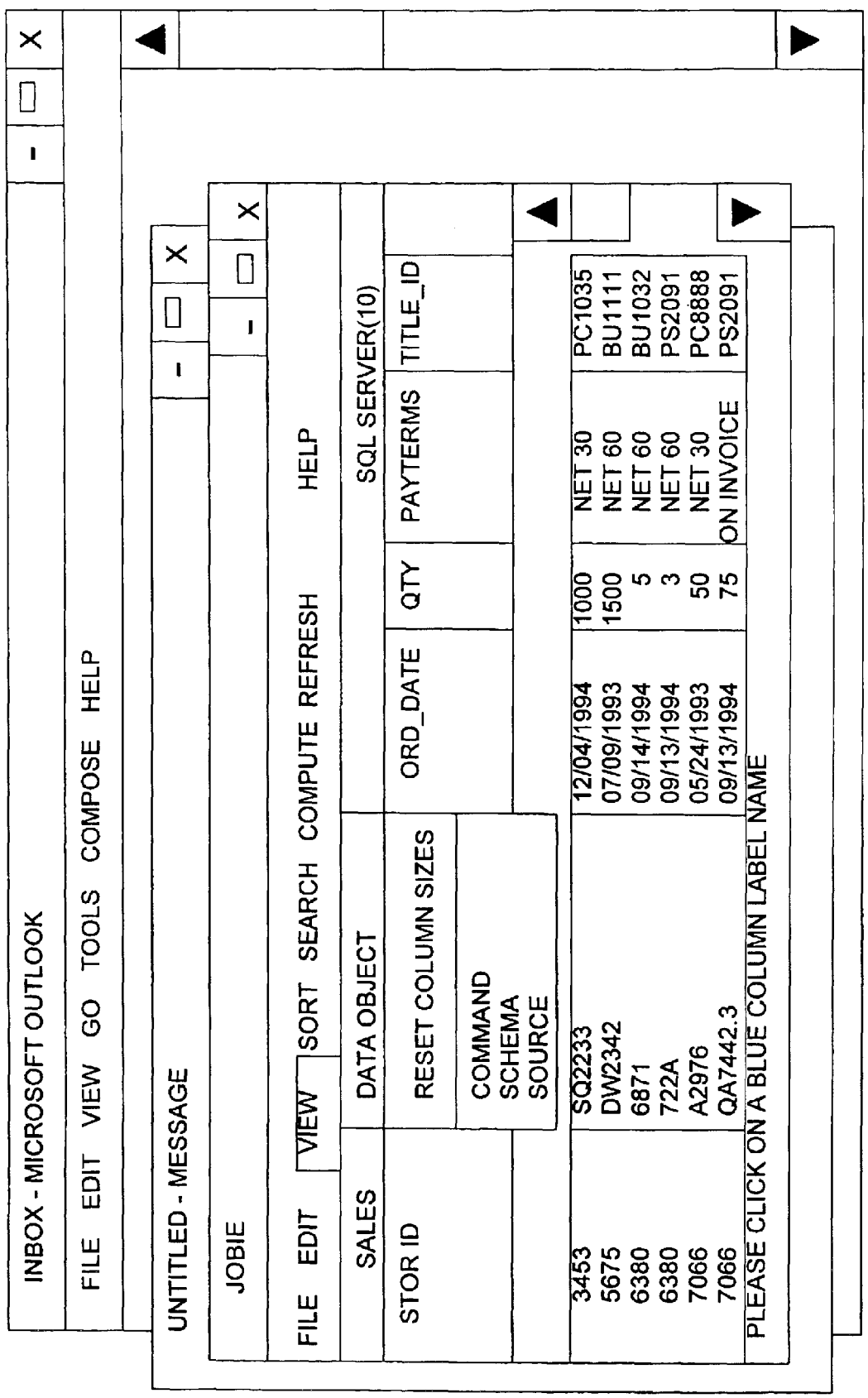
FIG. 18 is a seventeenth computer screen display illustrating a first display generated according to the preferred embodiment.
Figure 19:
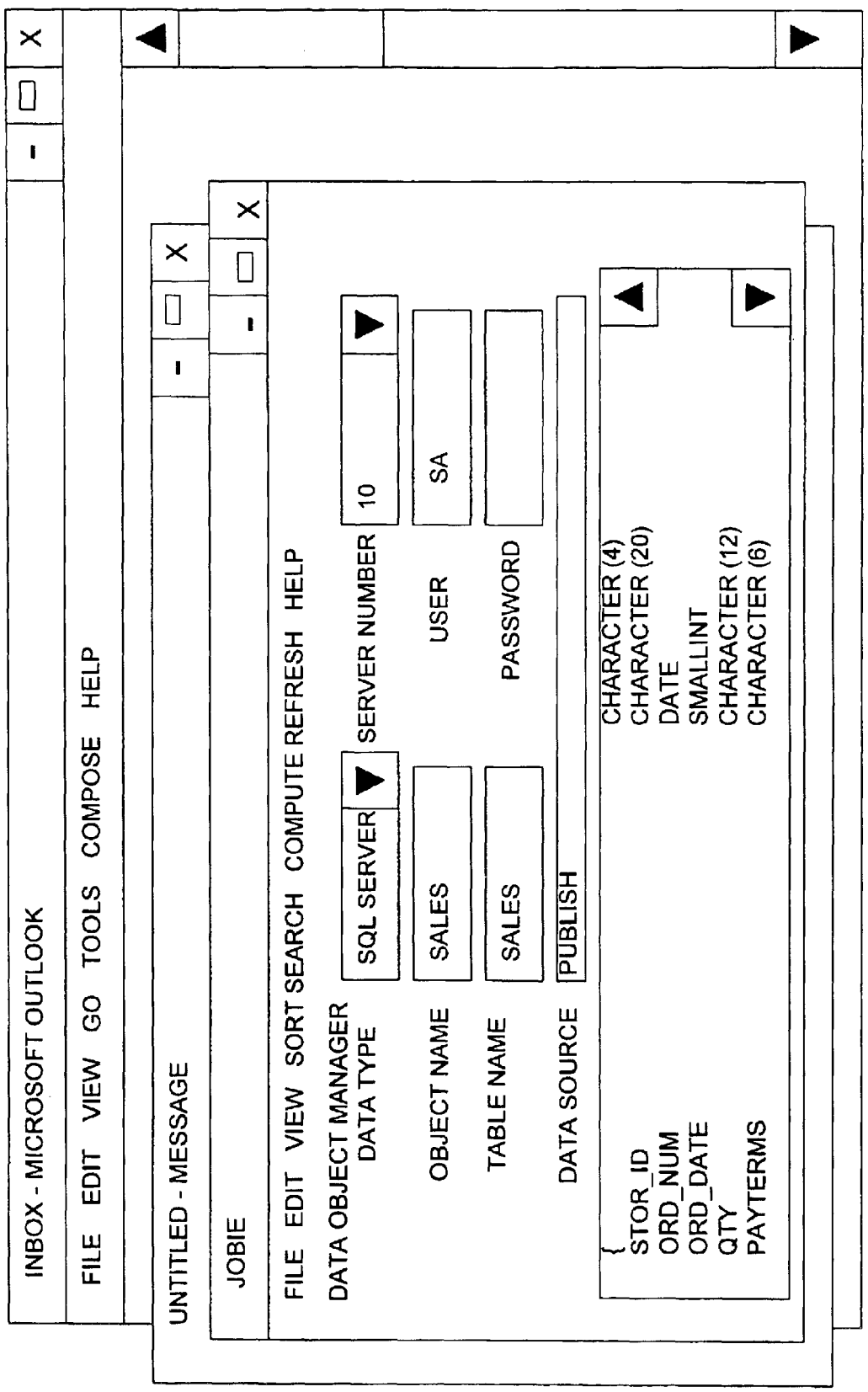
FIG. 19 is an eighteenth computer screen display illustrating a first display generated according to the preferred embodiment.
Figure 20:
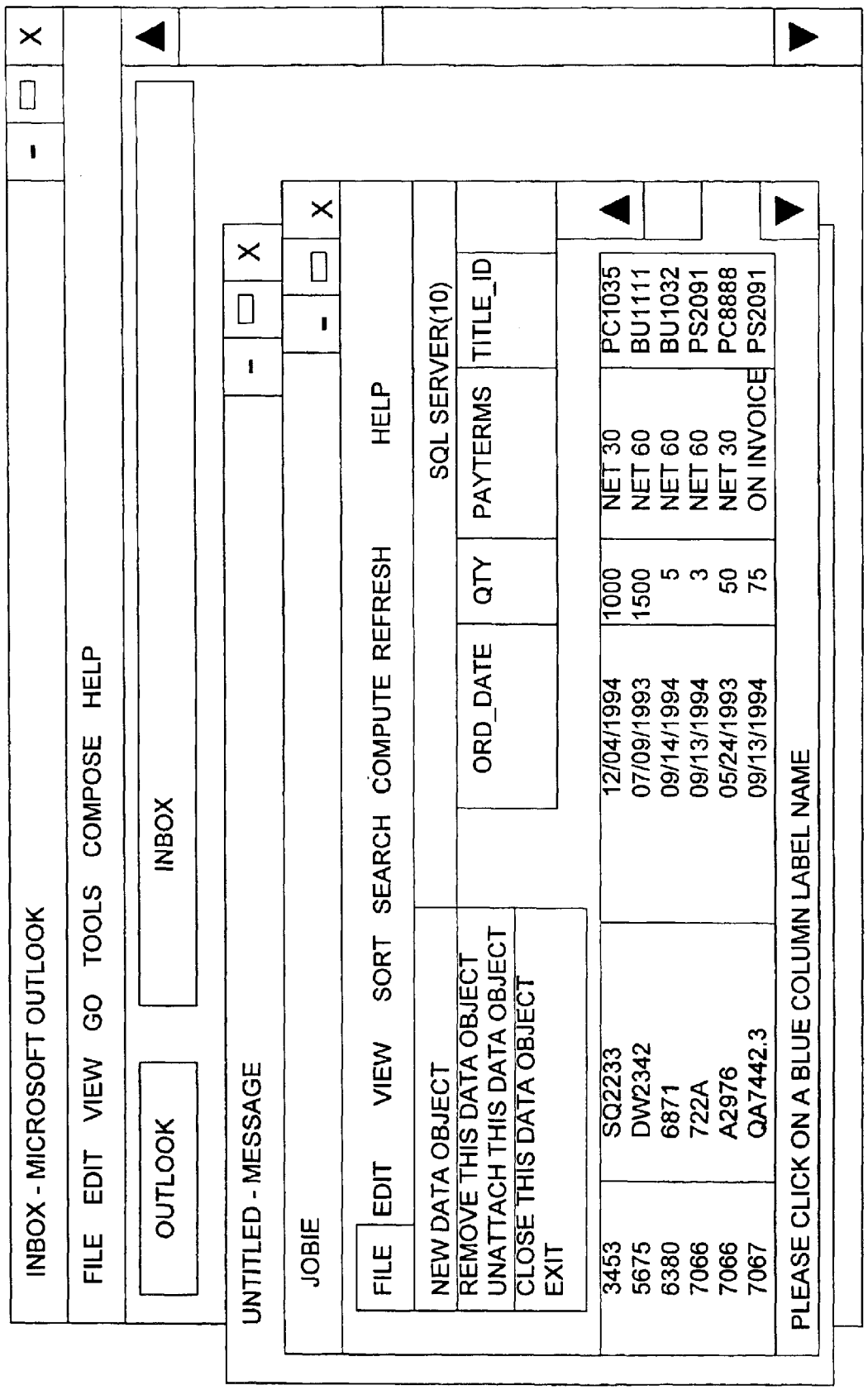
FIG. 20 is a nineteenth computer screen display illustrating a first display generated according to the preferred embodiment.
Figure 21:
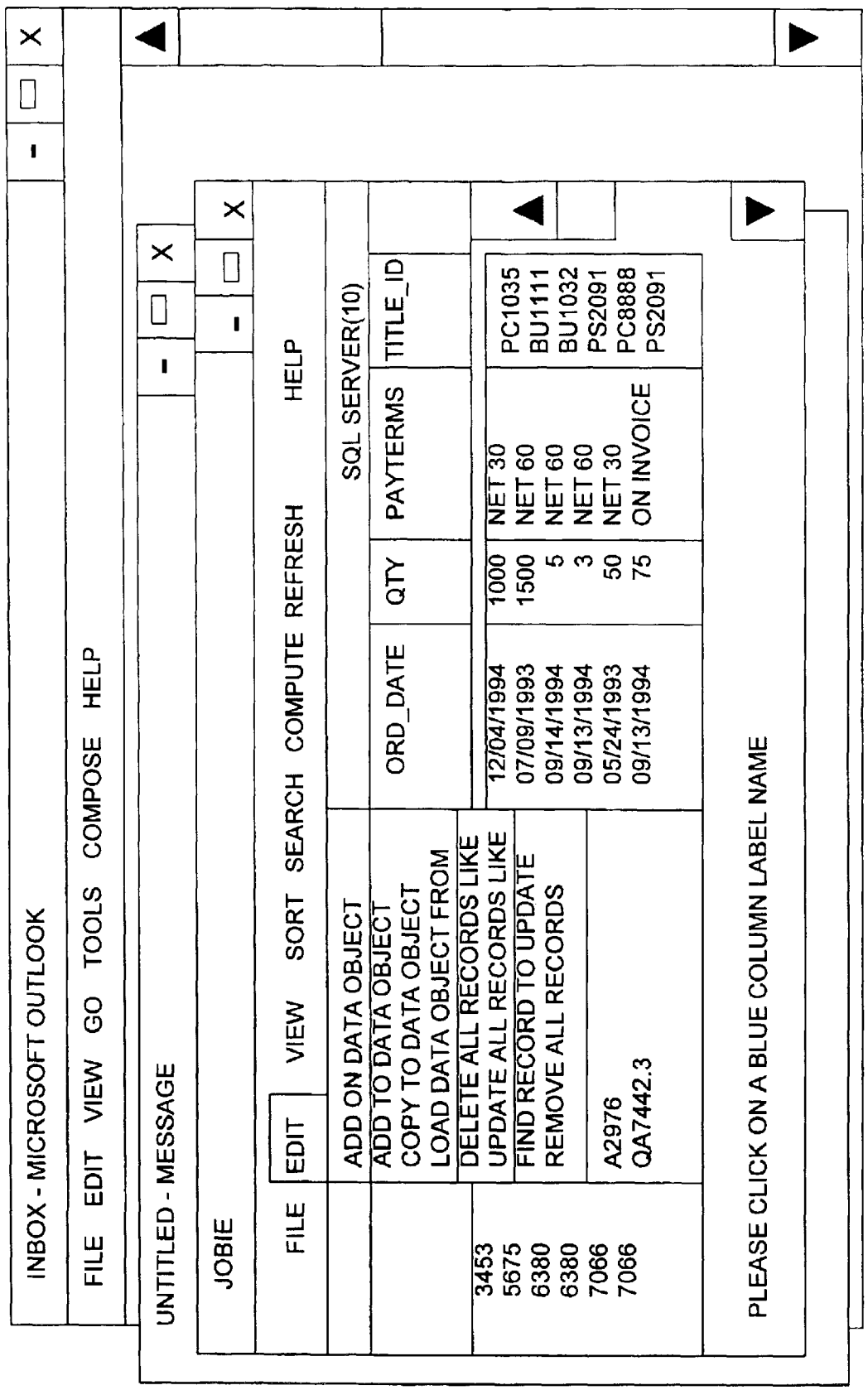
FIG. 21 is a twentieth computer screen display illustrating a first display generated according to the preferred embodiment.

FIG. 18 and FIG. 19 illustrate clicking or touching the "schema" designation of the "view" menu. In such case, the data corresponding to the "sales" object is displayed, as shown in FIG. 19. The sqlinfo (sales) command is used to retrieve the schema, etc., information for the designated object. The data type is Sequel Server and is on Server No. 10, the object name is sales and a description of the columns, etc is then displayed.

A power user can use the "source" command in the "view" pull down menu to display scripts generated for a request, and once the user has been verified as having appropriate security, the user can modify the script. The modified version will be used when "execute" is requested.

Figure 22:
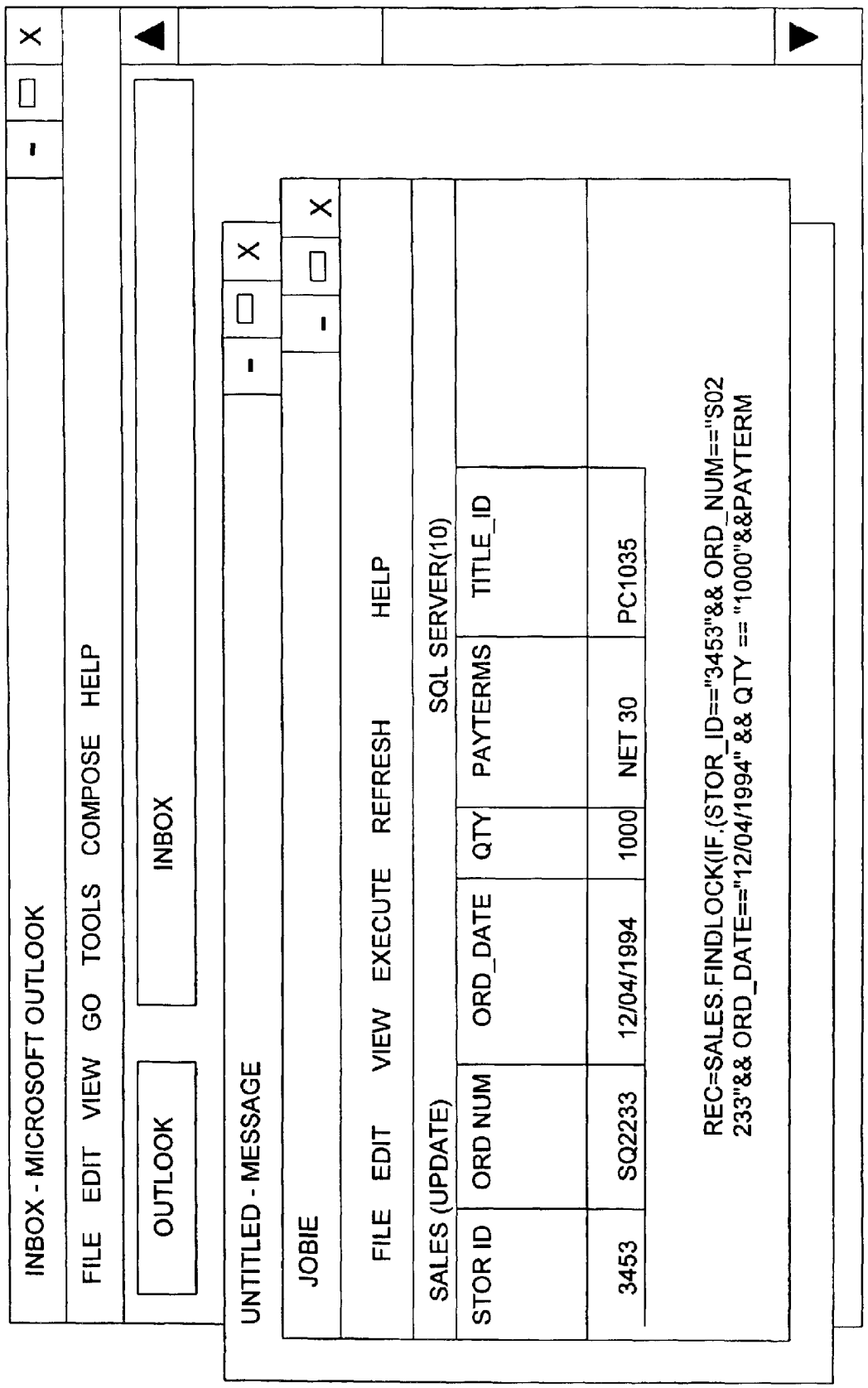
FIG. 22 is a twenty-first computer screen display illustrating a first display generated according to the preferred embodiment.

If a user wishes to create a new data object, data entry is necessary, which, for large scale, requires keyboard capability on the special device. But if a user wishes to remove a data object, add to it, close it, etc., this can be done via the menus illustrated in FIG. 20 and FIG. 21. FIG. 22 illustrates a case where "Update All Records Like" of FIG. 21 has been selected, and the user can update the data object from his special device with a minimal amount of data entry, for example, by using a stylus to touch the screen.

Figure 23:
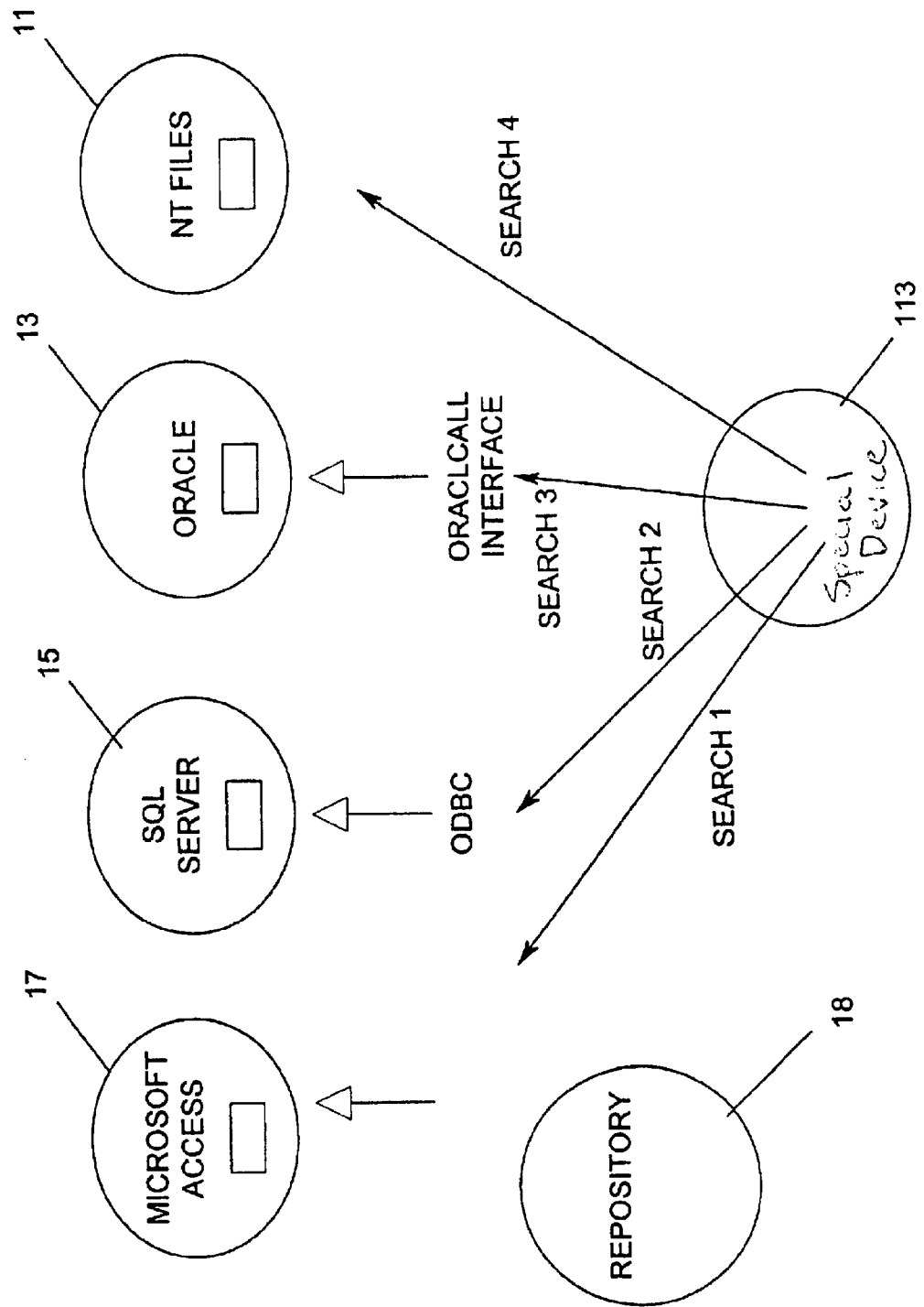
FIG. 23 is a system block diagram illustrating a method and apparatus according to the preferred embodiment of the invention.

The manner in which heterogeneous data is accessed from the special device 113 will now be described in further detail in connection with FIGS. 23–33. FIG. 23 illustrates a plurality of remote sites or nodes 11, 13, 15, 17 wherein data to be retrieved or accessed is typically spread across the respective nodes. In the illustrative example of FIG. 23, the data at node 11 comprises Microsoft NT files, the data at node 13 comprises an Oracle database, the data at node 15 comprises an SQL Server database, and the data at node 17 comprises a Microsoft Access database.

The generation of a script request, referred to as "commands" in connection with FIGS. 1–22, in response to a user point and touch operation on the special device 113 automatically sets in motion concurrent parallel accessing of all the remote databases 11, 13, 15, 17. The request illustrated in FIG. 23 is a search request, and the parallel searches are referenced respectively as Search 1, Search 2, Search 3 and Search 4. The searches provide parallel access to the heterogeneous data using a metadata approach and treating the heterogeneous data as if it were a single object. The simple query or request is first interpreted so as to pass the relevant part of the script from a user node across to the remote nodes. In the embodiment under discussion, queries or requests are presented as JAVA scripts.

Each of the searches is optimized with respect to the underlying data. For example, there are number of ways of accessing the Oracle database, such as via an OBDC connection or via the Oracle Call Interface. According to the preferred embodiment, the method used to access the Oracle database is via the Oracle Call Interface. This method is optimum for the purpose of the preferred embodiment because it provides the shortest path length to the data. Thus, standard database interfaces are used, while selecting the one which provides the shortest path length. The user selecting the query statement is unaware of the approach used to actually access the data.

The metadata describes the contents of the data object of a request (query). The metadata is contained in a repository 18, using data object models which describe the overall federation of servers and data sources. In the preferred embodiment, there are four categories of data source objects:

Distributed over the nodes of a cluster

Distributed over a network

Distributed over an SMP (symmetric multiprocessor)

Not distributed

A distributed network can be an Ethernet or nodes on a cluster or a gigabit/sec connection.

A repository application generates a set of data source descriptor files automatically from the metadata at run-time. The data descriptor files contain only the metadata corresponding to the data source object selected by the user, e.g. as discussed in connection with FIG. 5.

The descriptor file is held locally in an NT flat file in the special device 113, and is used at run-time in the interpretation of the query requests. The use of an optimized local file further supports high run-time performance. The repository used according to the preferred embodiment is the Unisys Repository (UREP). Various other repositories could be used such as Microsoft's or a standard one such as is being developed by the Object Management Group.

The descriptor file name is also used as the name of the data object in the query scripts, which data object represents the highest level of abstraction of the federation of data in question. For example, the descriptor file corresponding to an object, cluster population, would be called "cluster population." A user screen selection might cause generation of the following command:

cluster.population.search (if (bdate=xx/xx/xx)), searching the population (perhaps the population of the United States) for all persons with a particular birthdate. As discussed in more detail below, an "agent" interpreting this script will refer to the local descriptor file, cluster.population, to determine the nature of the object.

In the case of FIG. 23, the metadata indicates that the data is contained in the SQL Server, Oracle and/or NT files databases 11, 13, 15 and sets forth the organization of all the data in the respective databases, e.g. the columns and rows and how to interpret the data stored in the database. Accordingly, the user at special device 113 does not need to know the data structure and is thus generating applications at a transparent level, i.e., treating the whole network as a single object and writing methods on it.

The interpreter or "agent" process employed at the special device 113 interprets the script/request and "looks up" the appropriate metadata from the NT descriptor file stored on the special device. This agent then sends appropriate scripts to the particular nodes which contain data corresponding to the data object. An agent (interpreter) module located at each remote node interprets and executes received scripts.

Each agent comprises a module of code (an NT process or the equivalent in another operating system). Thus, two levels of interpretation are employed, a first to interpret the script and a second to interpret and execute the interpreted script at the appropriate nodes. As much processing as possible is performed close to the data, i.e., at the physical sites where the data is stored, in order to minimize message traffic between user and nodes. Thus, a function shipping model is used.

According to the example being discussed in connection with FIG. 23, the agent at each remote site, 11, 13, 15, 17 receives the interpreted client request, which includes a data source object name and the methods to be applied, which were originally embedded in the script generated at the special device 113. The remote agent determines from the data source object (1) whether the data is distributed, and if so, (2) the way in which it is distributed. These details (1) and (2) are contained in the repository 18 of metadata. Once armed with items (1) and (2), the remote agent performs the required method(s) upon the data.

Figure 24:
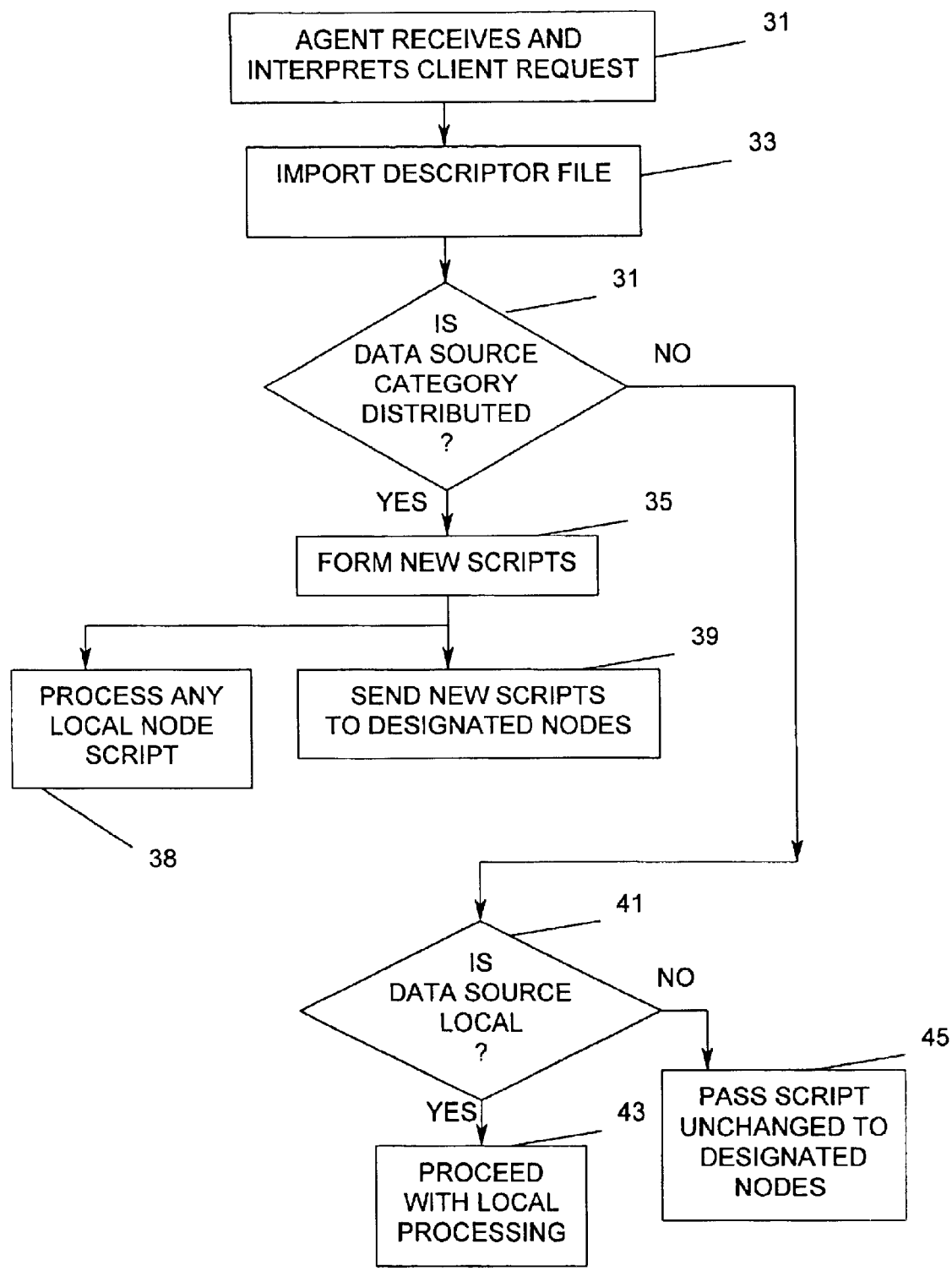
FIG. 24 is a flow diagram illustrating structure and operation of an agent process according to the preferred embodiment.

The first level (local) interpretation of the two level interpretation process will now be further detailed in conjunction with FIG. 24 and an illustrative example of operation according to the preferred embodiment of the invention. According to step 31 of FIG. 24, the agent at the special device 119 first receives the client request, which, in the preferred embodiment is in the form of a Java script. The agent then interprets the script. The data source object name (e.g., C_sql_data) is embedded in the script, as are the methods to be invoked on the referenced data source (e.g., "sort" in C_sql_data.sort(state(d)).

The data source object is categorized by whether it is distributed, and the way in which it is distributed. The category of the data source object is specified in the data source descriptor file. As noted above, the latter is a text file with the same name as the data source object itself, i.e., C_sql_data.

At the beginning of the local interpretation of the script, the agent imports the descriptor file, step 33 of FIG. 24. In step 35, the local agent examines the descriptor file and determines the next processing step, depending on the category of the referenced data source object.

If, in step 35, the data source category is determined to be "distributed," the agent proceeds to step 37 and breaks the script into new scripts appropriate to the designated nodes. The new scripts are then sent to the designated nodes for further concurrent processing, step 38, 39 of FIG. 24. The agent on the processing node checks the data source type to determine the next processing step (there are three data source types: NT file system, SQL Server, Oracle)—and then proceeds with the processing.

If, in step 35, the local agent determines that the data source is non-distributed, the agent proceeds to the test 41 to check to see if the data source location is local or not. If not local, the agent passes the script unchanged to the designated node, step 45. If local, the agent checks the data source type for next processing step and proceeds with processing, step 45.

The following code provides an example of local interpretation of the user script, C_sql_data.sort(state(d)), presented at node 1 of a cluster:

```
#import C_sql_data
main ( ) {
        :
    C_sql_data.search(if(b_date == xx/xx/xx))
        :
Descriptor file C_sql_data resembles:
    SERVER = 1(sql_data), 3 (sql_data), 5 (nt_data)
    }
Descriptor file sql_data resembles:
    SERVER = 1; MS; sql_data = publish:authors;
{
    au_id*    unique    CHARACTER(11)
        :
    State*    null      CHARACTER(2)
        :
}
```

According to this example, a data source object, C_sql_data, is searched for persons with a particular birthdate. A data source descriptor file, with the same name as the data source object, indicates that C_sql_data is distributed across Nodes servers 1,3,5 of a cluster. Descriptor files on each node give details of the data distributed on that node (in this case, the data is in SQL Server databases on servers 1 and 3, and in an NT file system on server 5).

The agent on the special device 113 begins execution of the script by importing the data source descriptor file, C_sql_data. The category of the data is "cluster," the hosting server is "1" with the data distributed on servers 1,3 and 5. The agent processes the statement. In due course, the agent will check the syntax and verify, for example, that "b_date" is specified as a column in the descriptor of the sql_data object.

In processing the statement, the agent breaks the script into

```
sql_data.search( )    for server 1;
sql_data.search( )    for server 2;
nt_data.search( )     for server 5
```

The agent on server 1 processes the first statement; the second statement is sent to server 3; and the third statement is sent to server 5. There is an object with a descriptor file name, sql_data, on server 3 and an object with a descriptor file name nt_data on server 5. After the processing (sorting) at each node, the information is returned to the original (coordinating) agent for final processing.

By using a function shipping model, in which the search commands are sent to be executed as close to the data as possible, and only the results ("hits") are returned to the requester, the network traffic is minimized (compared with a data shipping model, in which all the data might be sent to the requester, and the search performed there). In the event that updates are involved, the approach also ensures that there will never be a later update in another server's cache, thus maintaining cache coherency across servers.

Figure 25:
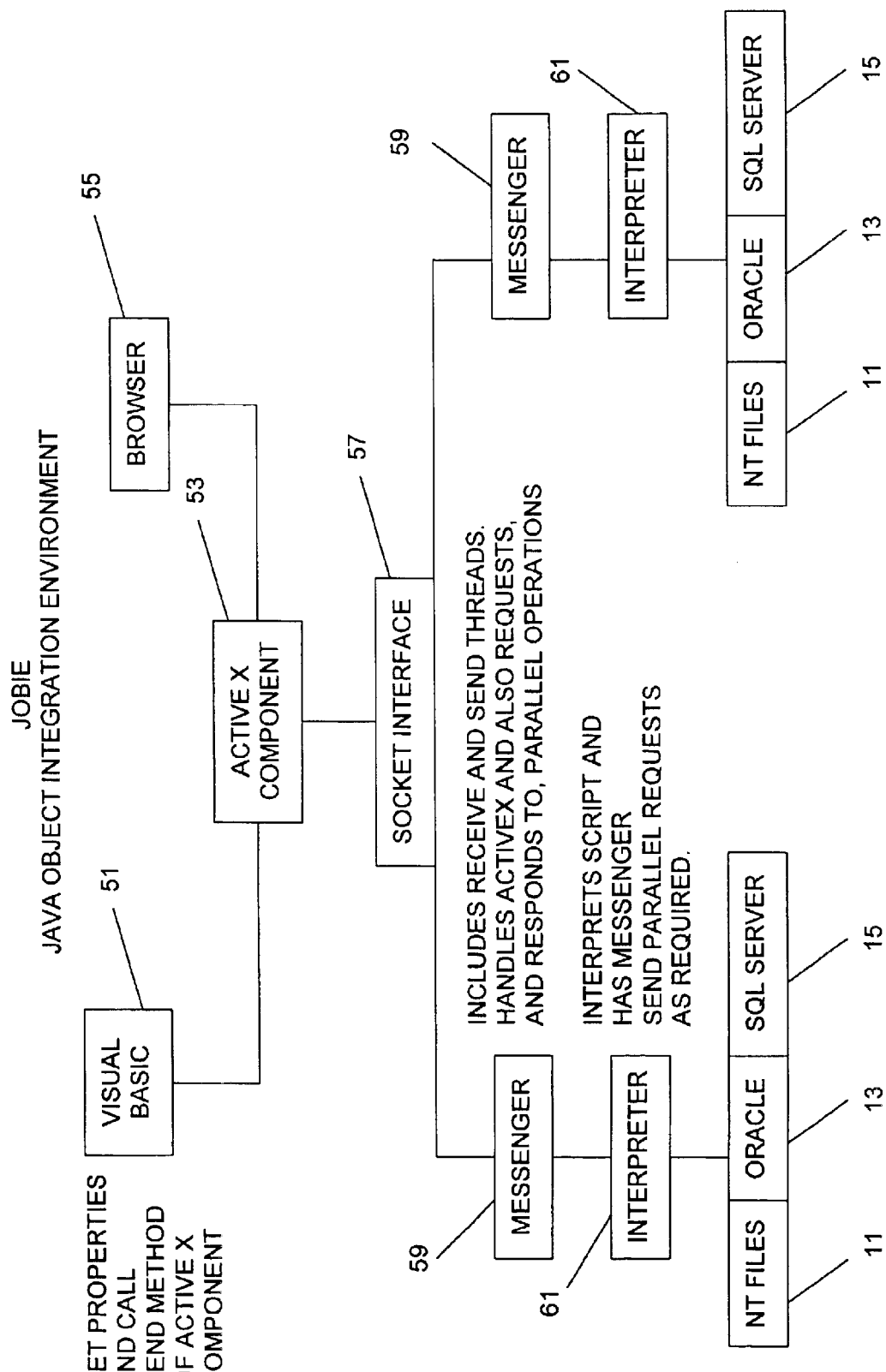
FIG. 25 is a block diagram further illustrating system architecture according to the preferred embodiment.

FIG. 25 provides an illustrative system architecture. According to FIG. 25, a Visual Basic client 51, a browser 55, or an Active Server Page, interfaces to an ActiveX component 53. The client sets information to describe its request (e.g., the name of a file containing a script to be executed) in a table within the ActiveX component 53 and calls a "send" method within the component. The ActiveX component 53 interfaces with a Messenger code module 59 via a Sockets interface. In this way, the apparatus appears to the client to be an ActiveX component.

The messenger 59 listens for messages from the Sockets interface 57, and its operation is illustrated in connection with FIG. 26. This module of code contains two key NT or Unix threads (or the equivalent for other operating systems): a send thread and a receive thread. The receive thread listens for new messages from a client or from an agent. The send thread returns results to the client, or sends requests to another server.

Figure 26:
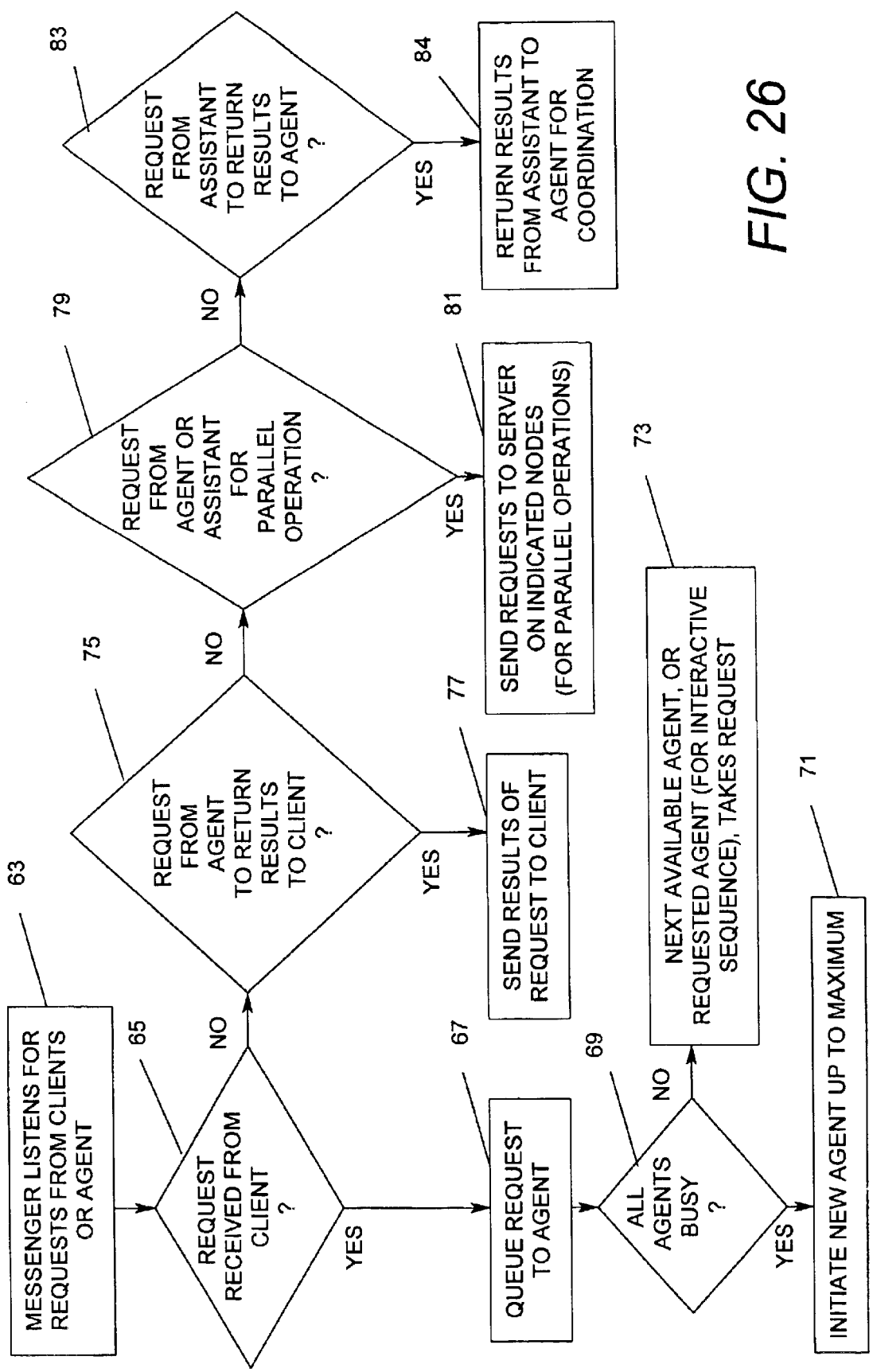
FIG. 26 is a flow diagram illustrating a messenger process according to the preferred embodiment.

As indicated by steps 63, 65, 67 of FIG. 26, on receiving a message from the Sockets interface 57, the messenger 59 queues the request for interpretation by an "agent" process 61, which analyzes the message and performs the request. If, on receipt of a message, the messenger 59 detects that all agent processes are busy at test 69, additional agents may be created, step 71, up to a maximum, using standard NT or Unix or equivalent operating system process initiation calls. If all agents are not busy, the next available agent process will interpret the request, as indicated by step 73.

On detecting that the data is distributed, the agent breaks the script into the appropriate scripts for each data source as discussed above and queues a request to the "messenger" process to send these scripts to the respective distributed servers to be processed in parallel. Thus, if successive "NO's" occur at tests 65 and 75 of FIG. 4, and a "YES" results at test 79, parallel requests are sent out. The receiving "messenger" process at the destination server queues the request to an "assistant agent" (which differs from an "agent" only in that it is always invoked from, and replies to, another "agent," rather than to an external client). The assistant agent interprets the script (for example, a "search" of local data), queuing the results and presenting a request to the local "messenger" for return to the requesting agent.

Thus, when test 83 of FIG. 26 is satisfied, results are returned to the local messenger in step 84 where the results are then consolidated. The agent may then request the messenger to return results to the client, test 75, step 77. In this way, automatic execution of methods is achieved across distributed heterogeneous data (in NT files, SQL server, Oracle, . . . ) transparently to the requester without the writer of the request (script) having to be aware of where the data is located, how it is accessed, where the methods execute or how they were created. If the data is distributed, the execution runs automatically in parallel. With implementation of the agent and messenger models on different operating systems, the servers may run on a heterogeneous mix of NT, Unix, 2200, A-Series, IBM, . . . etc.

Figure 27A:
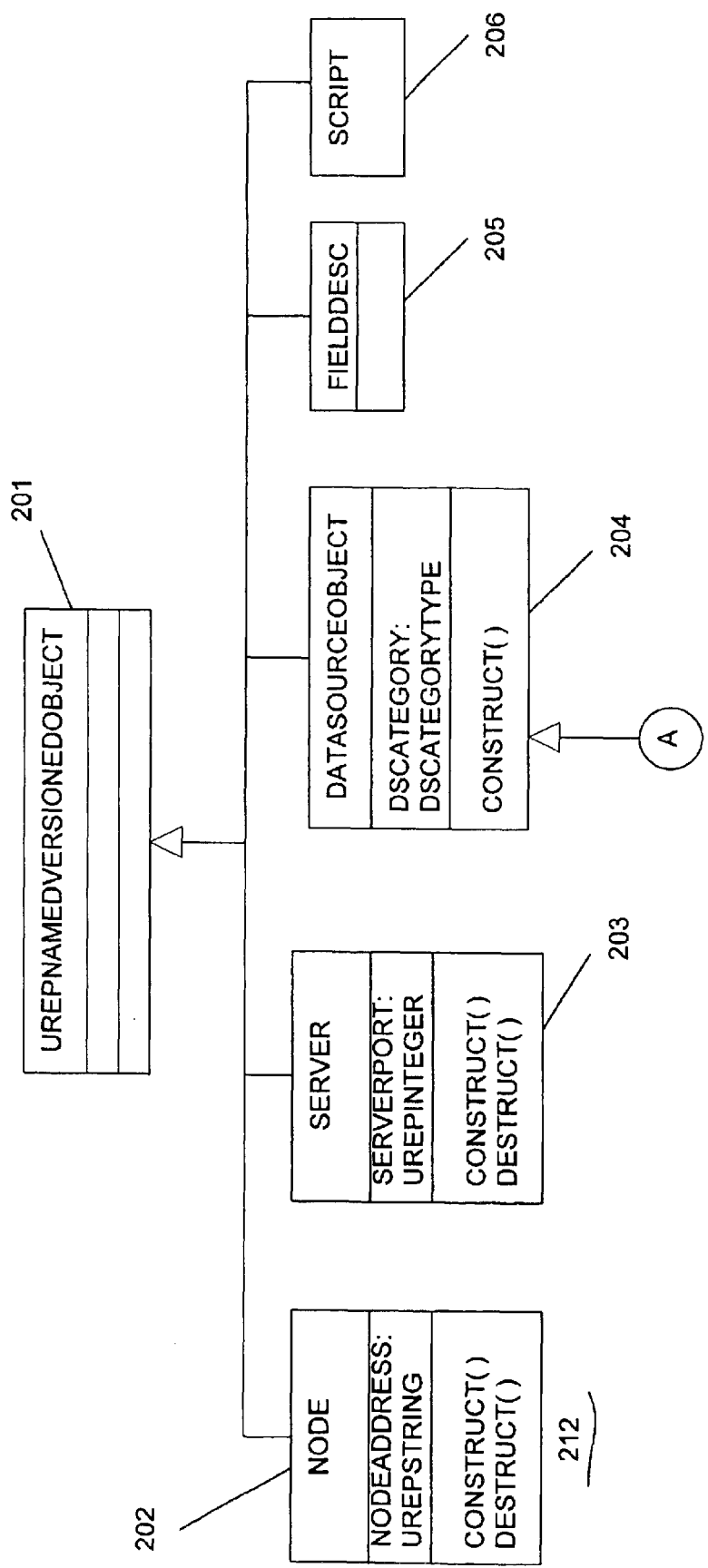
FIGS. 27A, 27B, and 27C are inheritance diagrams illustrating metadata employed according to the preferred embodiment.
Figure 27B:
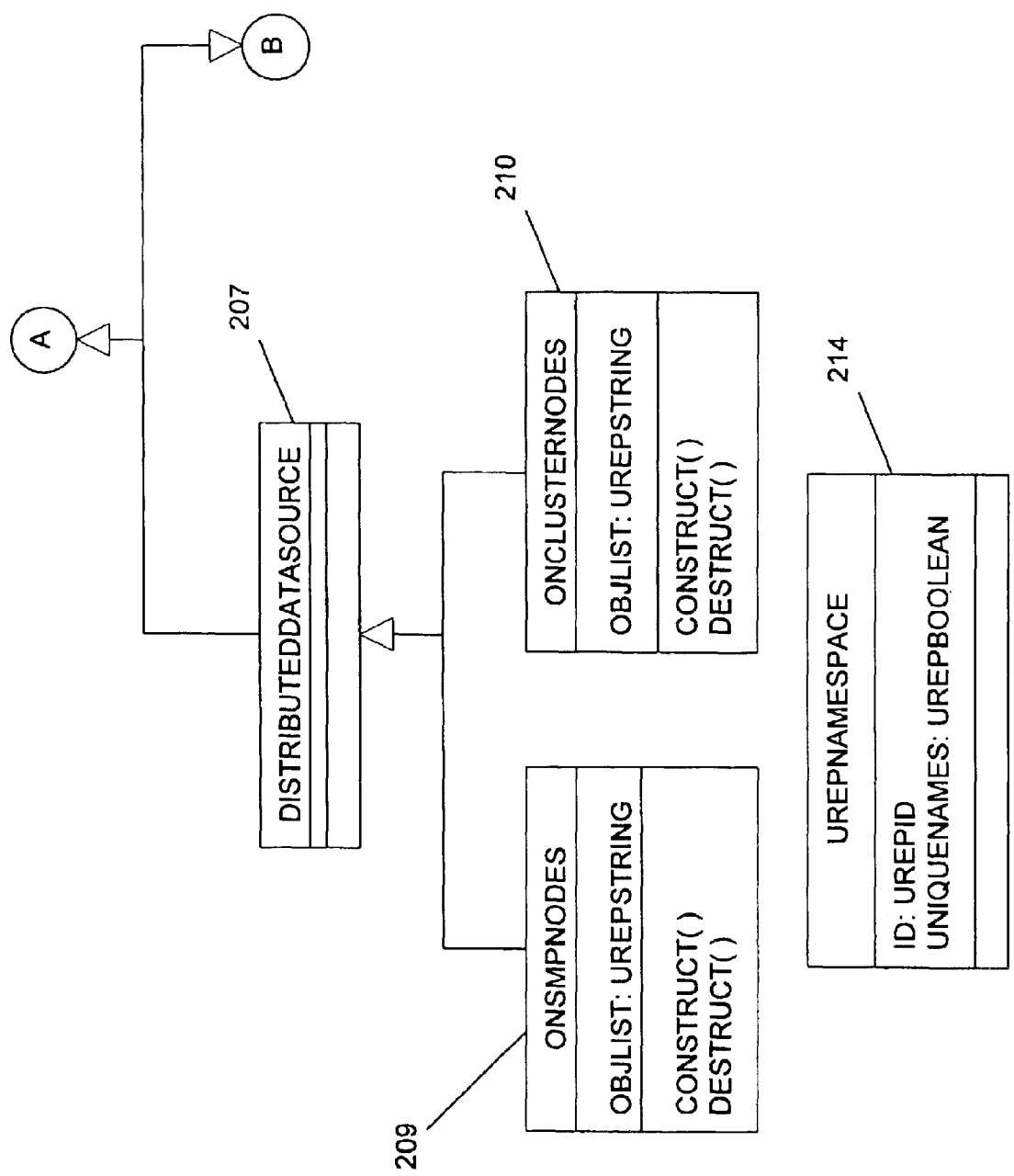
Figure 27C:
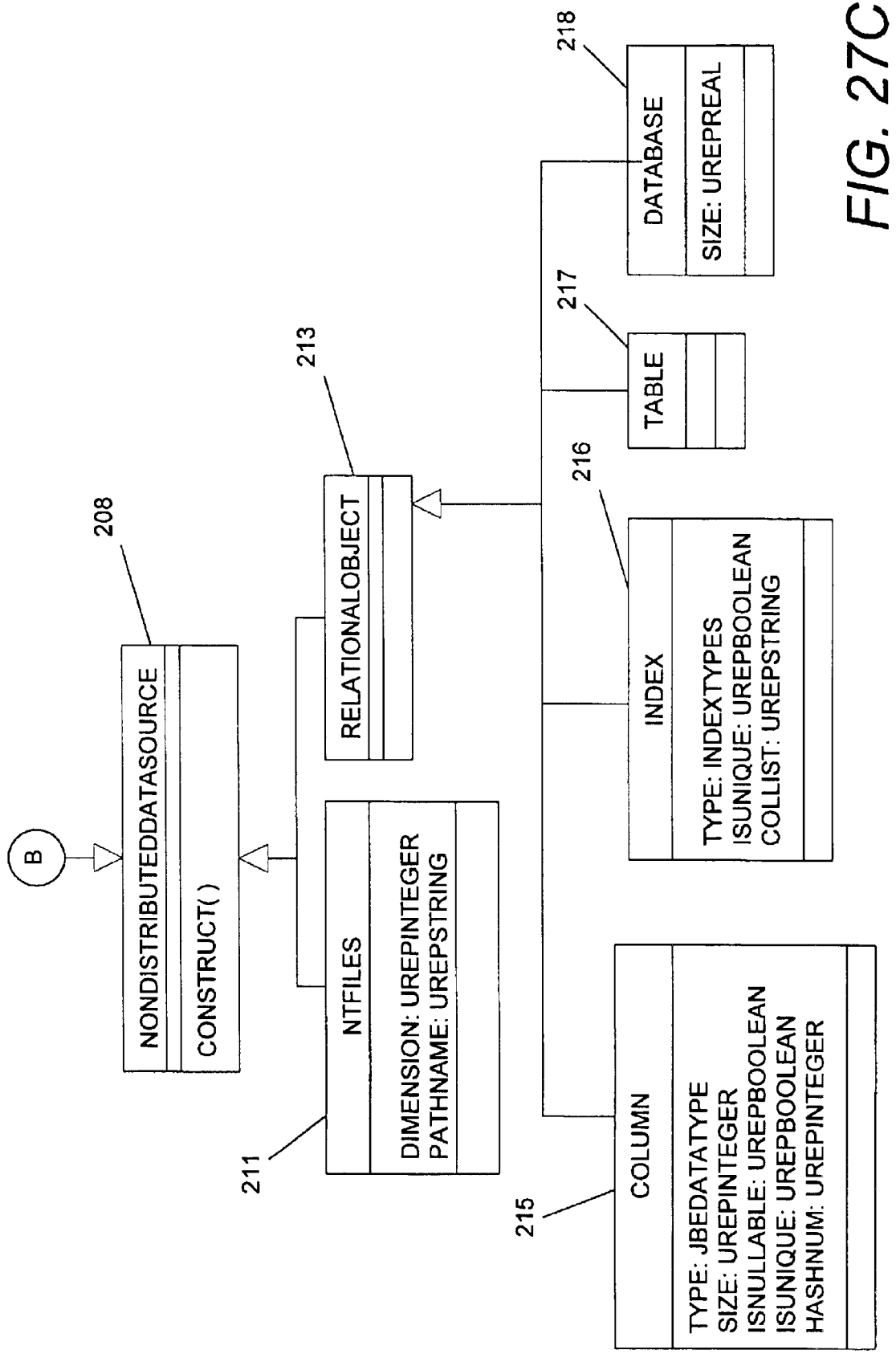

FIGS. 27A, 27B, and 27C are inheritance diagrams further illustrating organization of the metadata according to the embodiment under discussion. The box labeled "UREP Named Version Object" 201 of FIG. 27A represents the highest level of abstraction in the UREP and comprises a collection of data objects. The diagram of FIG. 27A further illustrates the basic concept that each data object contains embedded data and methods (operations) applied against the data where the data further consists of attributes and types.

FIG. 27A illustrates a second level of abstraction 212, which includes derived classes identified as System Node 202, System Server 203, Data Source Object 204, Field Desc 205 and System Script 206. Thus, each data object has associated therewith information as to the system node(s) where it resides, the system servers within a node which access it, its attribute as being distributed or non-distributed, the field descriptors for NT files and the methods associated with it.

The System Node class 202 includes information sufficient to describe each node in a cluster including attributes such as the Node Address which may, for example, represent an internet port sufficient to locate a node in question. The class 202 further includes construct( ) and destruct( ) methods to create or destroy a node.

The System Server class 203 includes all attributes and parameters regarding each server that resides on a node, where the "server" comprises the messenger, agent and assistant agent codes, i.e., everything necessary to receive a script and to execute it. The server attribute illustrated in FIG. 27A is the server port, which is the address (node and port) at which incoming messages are "listened for" by the messenger of the server in question The Data Source Object 204 comprises the names used for various objects in the script. The attribute "DSC category" indicates whether the particular object is distributed (207) or non-distributed (208). As shown in FIG. 27B, a distributed object 207 further includes subclasses 209, 210 as to the type of distribution, i.e., across SMP nodes or across nodes of a cluster. The "ObjList" attribute gives a list of the databases contained within the distributed data source name. In other words, the object name is broken down into sub-nanes that exist on the different nodes.

Non Distributed Data Sources 208 typically are either NT files 211 or a relational database object 213, which further break down into column, index, table and size schema 215, 216, 217, 218 as known to those skilled in the art. This is shown in FIG. 27C.

The Script class 206 contains the location of any otherwise unrecognized programs or methods and could contain programs or methods contained in URL's, in CORBA ORB environments, X/OPEN OLTP environments, as well as in local or remote NT executables or other script files.

Thus, a system Node contains one or more servers, each of which hosts its own set of Data Source Objects. The relationships represented in FIGS. 27A–27C and contained in the metadata indicate what Data Source Objects are related to which servers and thus supply the information necessary to create the local data source descriptor files at run-time.

The information represented by FIGS. 27A–27C is preferably captured at system set-up using a graphical interface under control of a system administrator with as much automation as possible in order to avoid unnecessary data entry. For example, such an interface provides automatic scanning of the rows and columns of a relational database. Once set up, the system runs applications automatically as illustrated herein.

The metadata may also include the location of otherwise unrecognized services, the API's (application programming interfaces) or protocols to be used in invoking services (effectively wrapping the "foreign" services). Services may also be sought in trading (OMG, ODP, etc.) networks, allowing a broad heterogeneity of service access, execution and creation. In this way, services invoked as a simple JAVA method may actually have been provided in Open/OLTP, Corba objects, Microsoft DCOM/COM+, Sun EJB, Linc, MAPPER, . . . , or other environments. In this respect, an infrastructure is provided akin to a parallel nervous system for the invocation and integration of heterogeneous services (invoked as JAVA methods). A system according to the preferred embodiment can span platforms, OS's, and architectures without a requirement for changes in the underlying OS.

Figure 28:
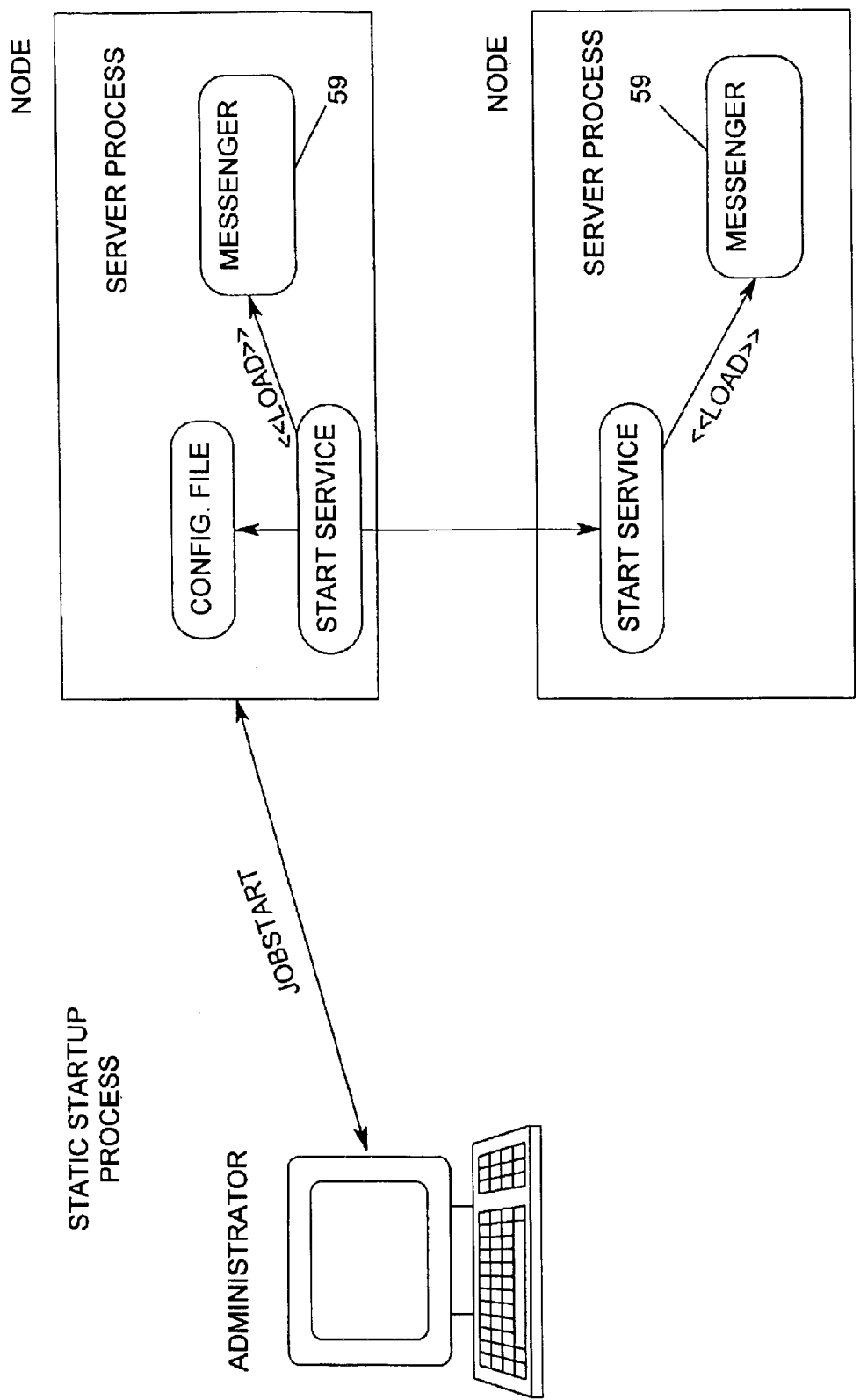
FIG. 28 is a schematic block diagram illustrating a node employing a static start-up process.

In an implementation according to FIG. 28, servers implementing the preferred embodiment run on all the nodes of a system which may be, for example, a cluster, a Uniysis cellular multiprocessing system (CMP), a network, or an SMP (symmetrical multiprocessor). The servers are preferably started by executing a program, "jobstart," from any node in the system. "Jobstart" calls an NT service, registered as "Start Service" automatically at "boot" time on each of the systems nodes, defined in a configuration file. The "Start Service" serves as a listener on the host node in question, performing the loading and invocation of the local runtime processes comprising the messenger and agent. Multiple processes may be activated, automatically, in the same node depending on performance considerations. As soon as the servers have been activated, the runtime process is ready to accept client requests.

Figure 29:
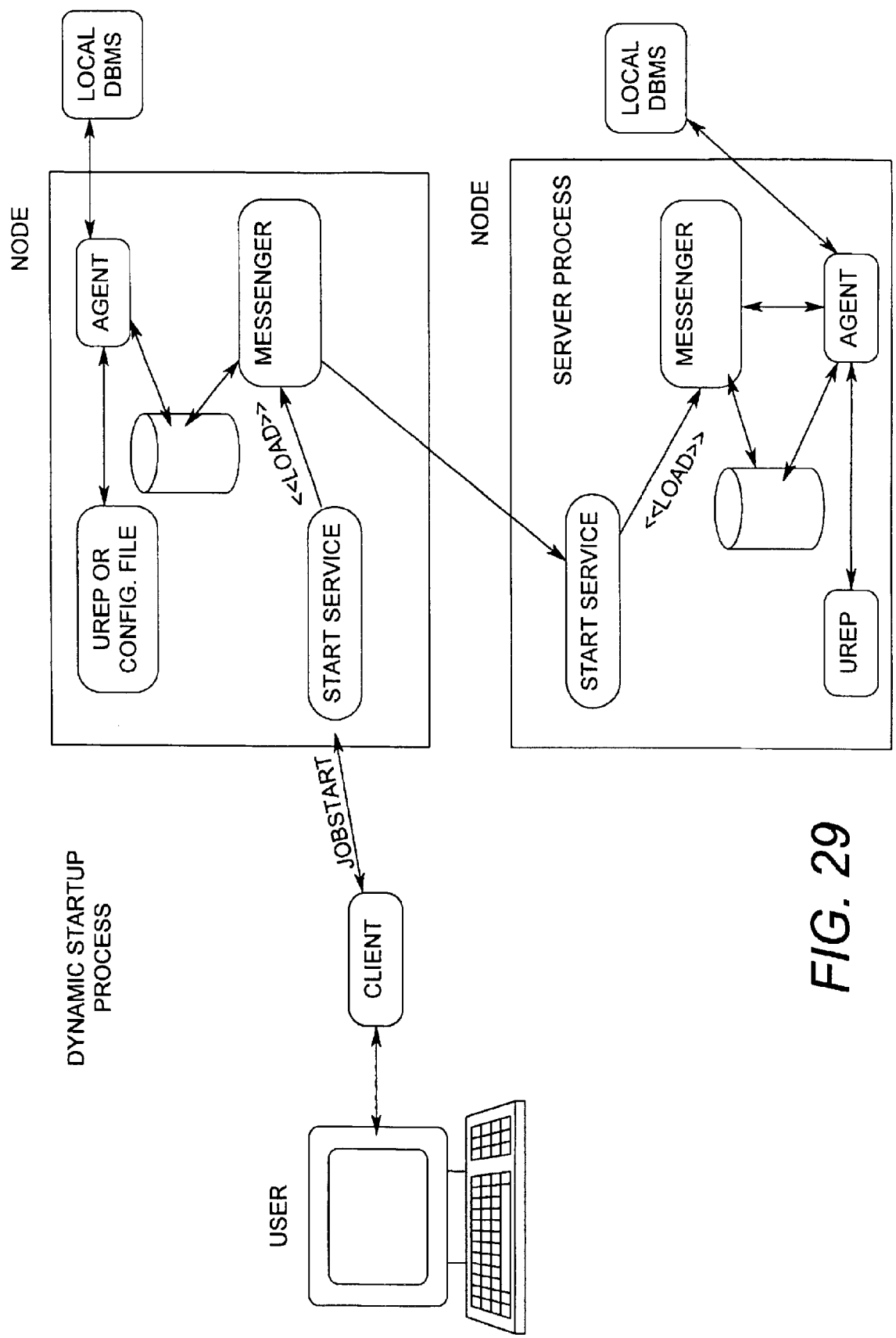
FIG. 29 is a schematic block diagram illustrating a node employing a dynamic start-up process.

In FIG. 29, the configuration of FIG. 28 is shown supplemented by a repository (UREP). Instead of a static start-up of all the servers in the system, a dynamic invocation, based on the client (user) request, is now provided. Based on the data source name (data object) supplied in the client request, the server to which the client application is attached, in processing the user request, retrieves from the repository the details of the locations which support the data source. The Agent process interpreting the scripts then dynamically activates only the servers required to support the user's request. The Agent is shown interacting with a DBMS (Database Management System). A hardware component suitable for implementing the system servers in a system like that of FIGS. 23, 28 or 29 is the Aquanta as manufactured by Unisys Corporation, Bluebell, Pa.

The Messenger is loaded and activated by the local NT service (the Start Service) on each node in the system. Initially, the client application, responding to a user's request, establishes a connection, via the WinSock interface, with this process (server). The server (process) acts as a "messenger" between the client and the agent process for the particular user. The "messenger" performs four key functions:

Acts as the "listener" to receive user requests from the client or from an agent on another node.

Sends the results of the request back to the submitter of the request (the client or an agent on another node).

Manages the creation of, and the assignment of tasks to, agent and assistant processes.

Sends and receives messages to and from these agents and assistants, using shared memory.

As noted above, the Agent process accepts and sends messages from and to the request queue, maintained by the messenger. As illustrated above, the key functions performed by the agent are to parse and process each request in the JAVA script, often resulting in operations on named data sources within the system which may be heterogeneous (e.g., in NT files, SQL Server, Oracle, . . . ) and distributed. In so doing, the agent looks up the descriptor of the data source. If the data is distributed across multiple nodes, the agent rewrites the script as multiple scripts. Each of the latter scripts consists of the operations, for a particular node specified in the descriptor, to be performed on the data sets residing in that node. These scripts are then sent to the "assistant" processes on these other nodes in accordance with the "function shipping" model. The system will typically be configured to run with an initial number of agent processes, with a maximum also specified.

In FIGS. 28 and 29 "node" is used to describe the physical hardware, e.g., an Aquanta server (as in a "node on the network" or a "node of a cluster"). A server is the "apparatus" residing on that node comprising the messenger, agent and assistant code modules. Multiple servers may reside on a single node. The servers may be viewed as comprising part of a "federation." A federation is a group of servers which have access to the same data, objects and scripts. There may be more than one federation in a system.

Figure 30:
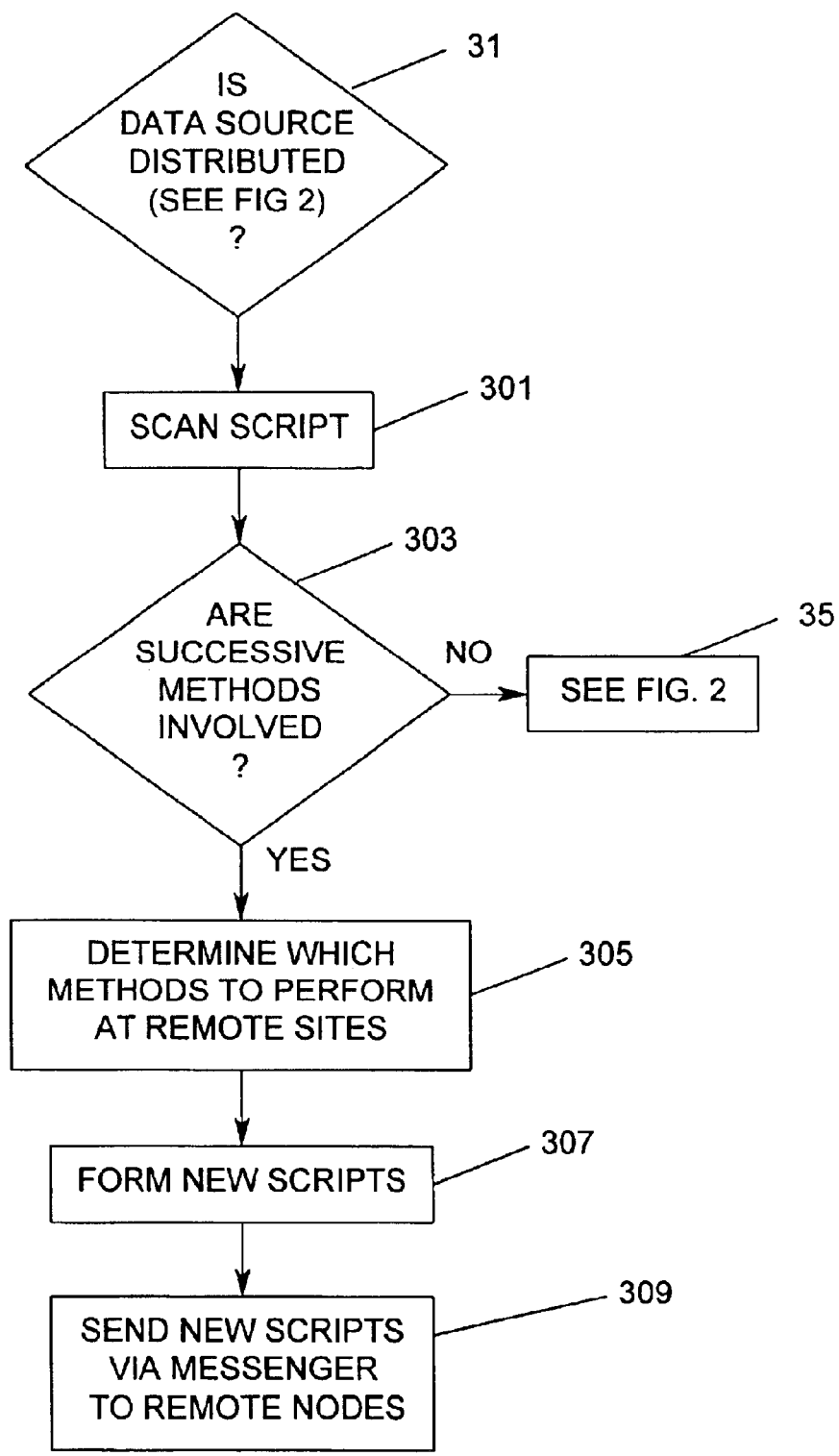
FIG. 30 illustrates operation of an agent process at a local node in response to a request containing concatenated methods.

FIG. 30 illustrates processing of a script which contains multiple successive or "concatenated" methods. In test 31 of FIG. 30, the metadata is checked by the agent at the local site to determine whether the data source is distributed. Test 31 corresponds to test 31 of FIG. 24.

In Step 301, the local agent scans the script. In test 303, the local agent determines whether successive methods are included in the script. If not, the routine proceeds to step 35 of FIG. 24.

If successive methods are involved, the flow proceeds to step 305 where the local agent determines which methods should be performed at the remote sites. This determination is preferably made by accessing a simple table which indicates whether a selected method should be performed remotely adjacent the data or at the user site upon the returned results.

In step 307, the statement is broken into scripts appropriate to the servers at the remote nodes. For example, one may propound the statement:

population.search( ).sort( ).mail( )

to search, for example, the population of the United States for people with particular attributes, sort the results of the search, and then mail the results of the sort. In such case, if the data in "population" were distributed across databases in servers on nodes 1, 3 and 5, the script:

populaion.search( ).sort( ).

is sent to the servers at each of the nodes 1, 3 and 5. Thus, in this example, the local agent has determined from a table that "search" and "sort" are methods designated for performance at the remote sites, and has generated an appropriate script to send to each of the sites.

The assistant agent at each of the remote servers on nodes 1, 3 and 5 then interprets the respective script and, on finding the successive methods, search( ).sort( ), performs the first method (search( )) and then leaves the results of that method stored in memory, rather than causing the results to be returned to the coordinating local agent. The second (or further) method(s) are then performed on the results of the earlier method(s), and only when the results of the succession of methods are complete, are the results returned to be merged by the coordinating agent. In this way, if the data object ("population") is distributed, the methods (search, sort) are performed automatically in parallel on the distributed data.

Figure 31:
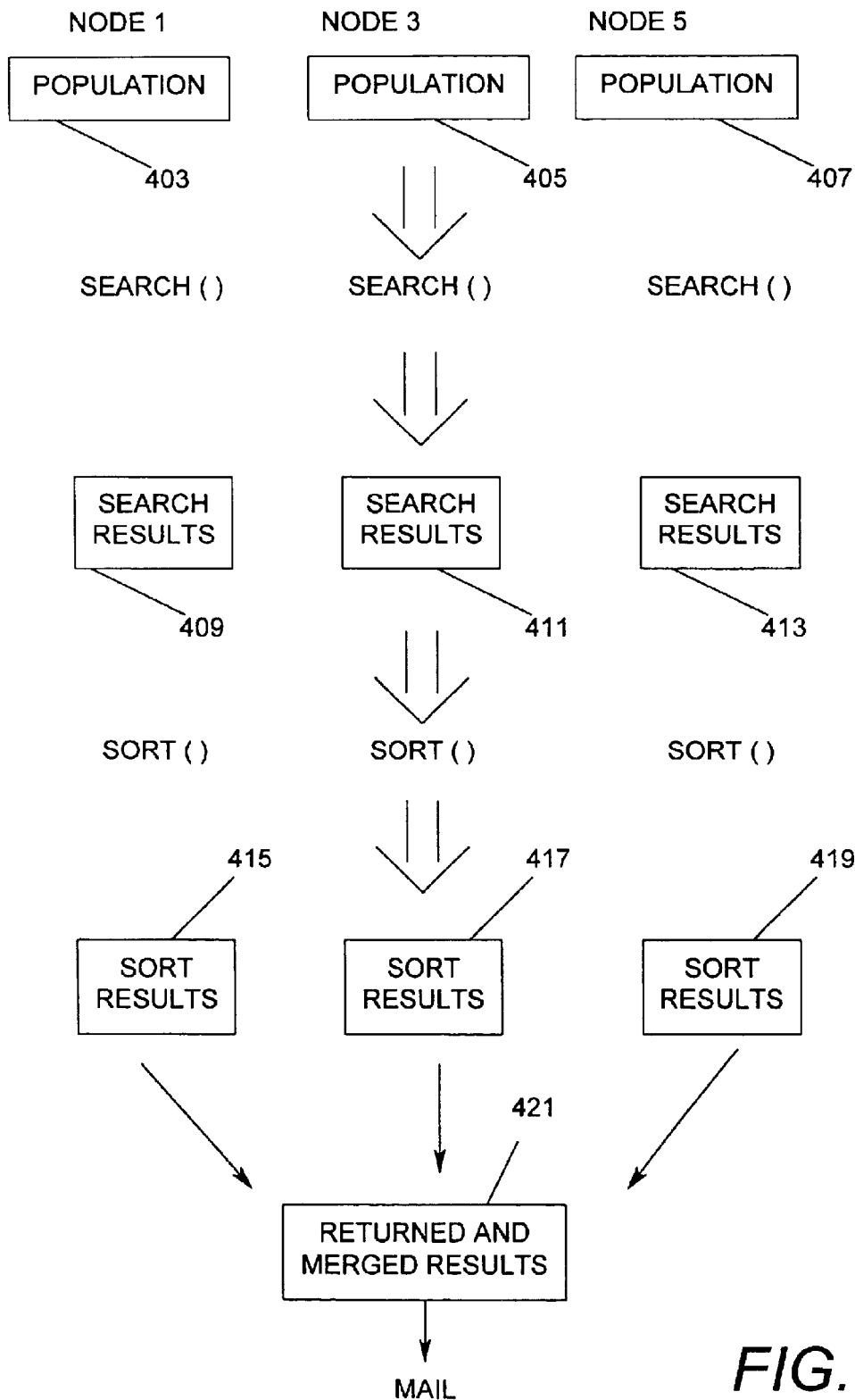
FIG. 31 illustrates operation of an agent process at a remote node in response to a message generated according to FIG. 31.

An example of operation of the remote agent is illustrated in FIG. 31. The data object "population" 403, 405, 407 is retrieved at each of three respective nodes: Node 1, Node 2 and Node 3. The method "search( )" is performed by the remote agent on each respective data object, producing respective search results 409, 411, 413 stored temporarily in memory at each of the respective Nodes. The remote agent then executes "sort( )" on each of the respective search results, yielding respective sort results 415, 417, 419. The remote agents then transfer the respective sort results to the respective remote messengers, which return them to a coordinating agent at the originating site. The coordinating agent creates the merged results 421 and executes the Mail method to e-mail the final results. The search, sort and mail methods are described further below in connection with discussion of a preferred set of methods performed by the Agent.

According to the preferred embodiment, a capability is provided which permits the user to run his or her own programs and applications. The capability is referred to as "Multiple Points Of Logic" or "MPL". The MPL capability may exist as both a command and a method initially signaled by a function designator in the script, which in the embodiment under discussion is "mpl".

The command version provides an easily used mechanism for enabling the user to run user-defined scripts or executable programs automatically in parallel on multiple servers. The user indicates, as parameters in the MPL command, the servers on which the embedded or named script or executable program (e.g., .exe file) is to be executed. Thus, these "multiple points of logic" may be run concurrently on multiple servers of the system. Since the script may access data sources, a means is provided to execute, concurrently, whole applications on the nodes of distributed networks. Thus, the apparatus may be used whenever an objective is to run commands or programs concurrently.

The method version of MPL provides an easily used mechanism for employing the infrastructure of the system to run user-defined scripts (embedded or named scripts or executable programs) as methods automatically in parallel against potentially distributed heterogeneous data sources.

For example, consider the script:

population.mpl ('strip_data')

On detecting from the metadata that the "population" data object is distributed, the mpl is interpreted by the interpreting agent as an instruction to send the named script, 'strip_data', to each of the servers across which the data is distributed. The script is then be run automatically in parallel against the data on those distributed servers by the agents at those servers. The results are subsequently returned by the messengers at those servers to the originating agent for coordination/merge. The named script 'strip_data' may also be an embedded script (where the full script is enclosed in the brackets following mpl) or an executable file, e.g., a C program contained in xyz.exe or a script in xyz.bat.

Figure 32:
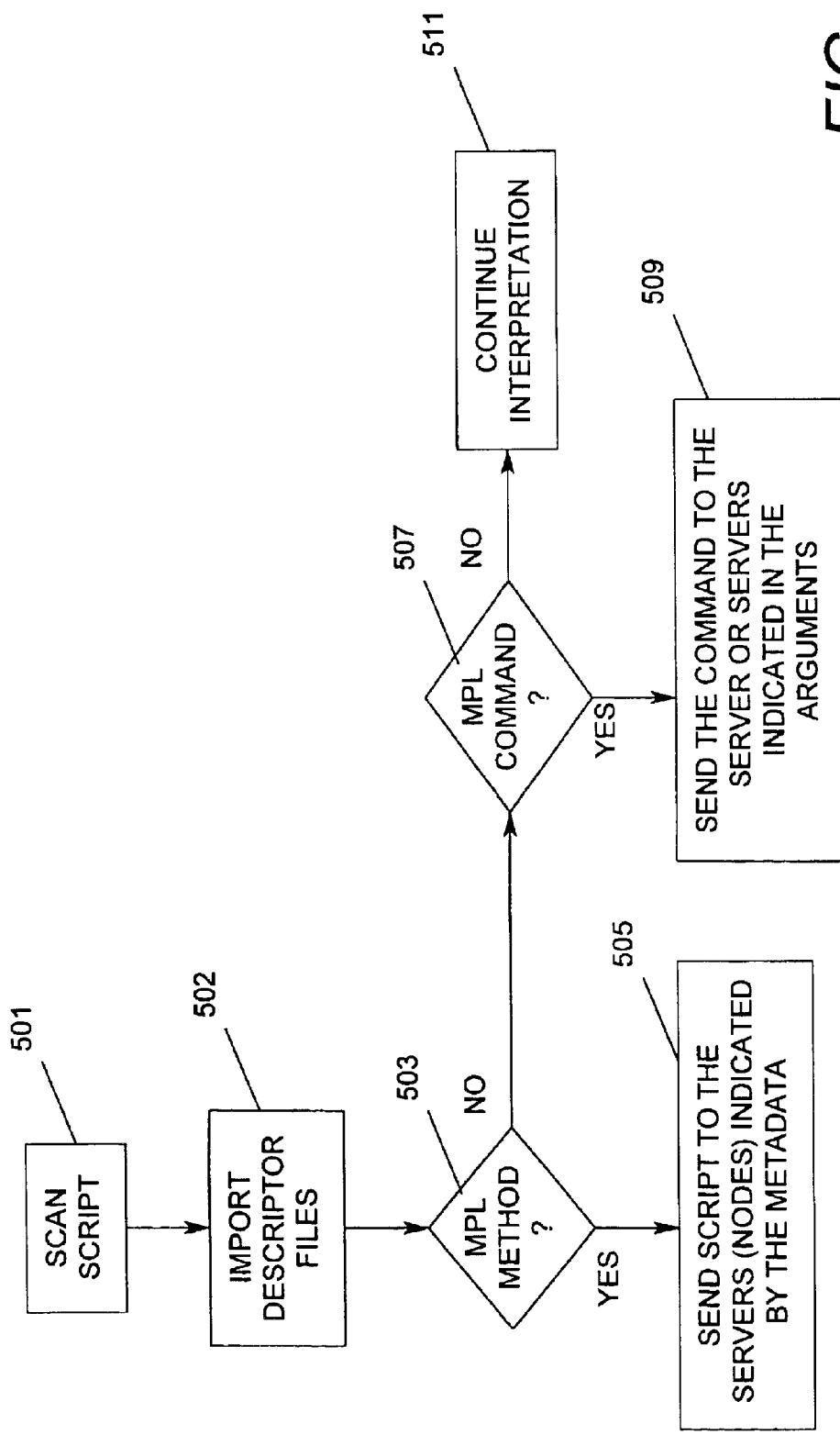
FIG. 32 illustrates operation of a local agent in response to "Multiple Points of Logic" methods and commands.

FIG. 32 illustrates the operation of the Agent at the user site in response to detection of an MPL method. FIG. 32 will now be described in connection with the following particular user-inputted script:

```
#import    Personnel
#import    Client
main( ) {
    Personnel.mpl('strip_data');
    Client.write(this);
} //main
```

Upon scanning of this script, step 501, the agent imports the descriptor files for the "personnel" and "client" objects step 502. Upon detecting at test 503 that the script includes an MPL method and that the data object "personnel" is distributed, the agent forwards the script (Personnel.mpl ('strip_data')) to the respective nodes where the data object resides as indicated by step 505. With respect to the system of FIG. 23, for example, if the data object resides on the SQL server database 15, the Oracle database 13, and the NT files database 11, the agent transmits the script, Personnel.mpl ('strip_data'), to each of the nodes:

(a) to node 15: Personnel.mpl ('strip_data')
(b) to node 13: Personnel.mpl ('strip_data')
(c) to node 11: Personnel.mpl ('strip_data')

Figure 33:
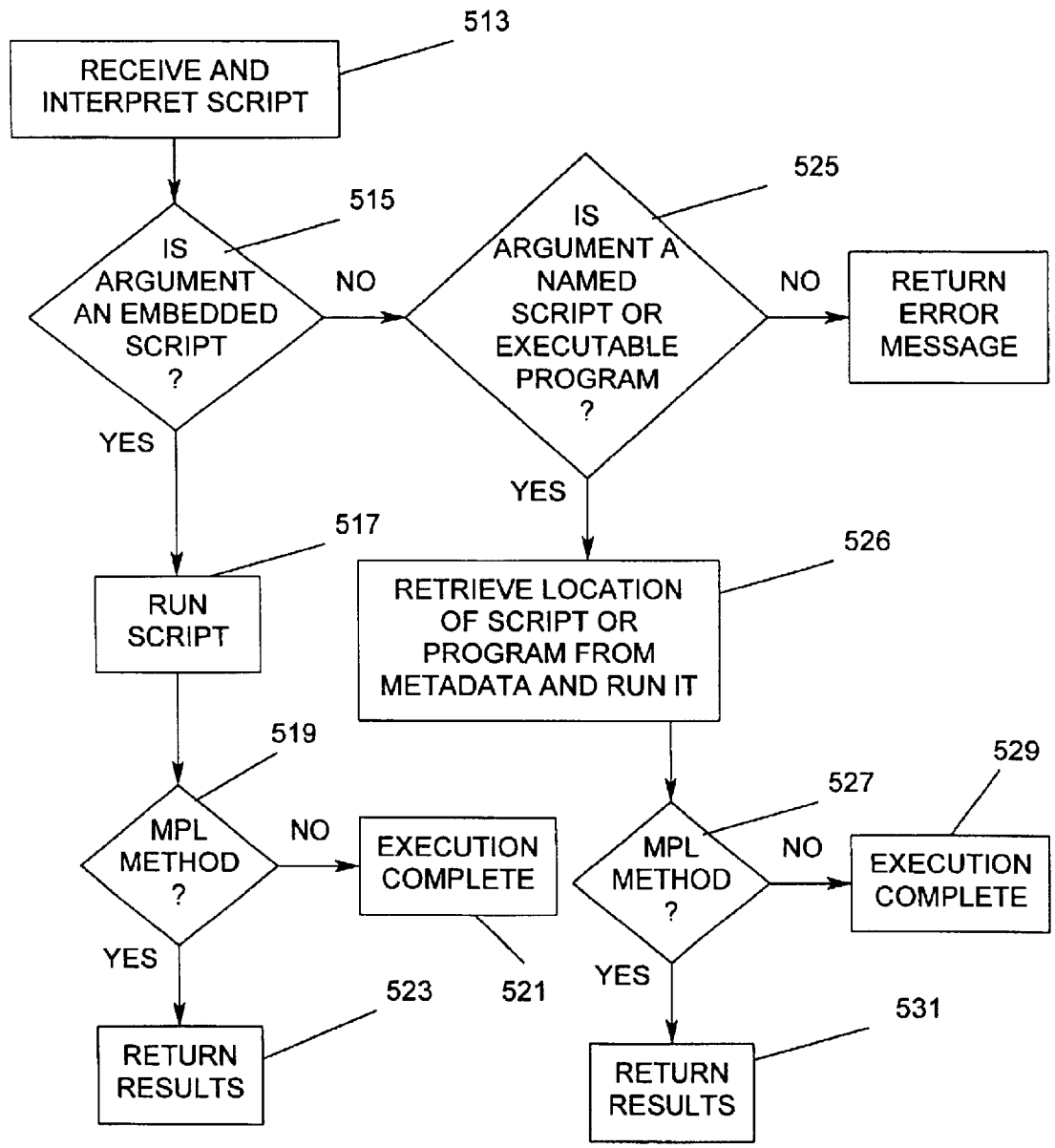
FIG. 33 illustrates operation of a remote agent in response to messages generated according to FIG. 32.

FIG. 33 illustrates the processing of each of the scripts when received by the remote agent at each node at step 513.

The remote agent first checks the argument of the MPL method to determine whether it contains an embedded script, a named script or an executable program. Embedded scripts are included in inverted commas, while inverted commas do not surround named scripts or executable programs. In the case of the named scripts or embedded programs, the remote agent interpreting the script seeks the name in the "scripts" section of the metadata. The metadata contains the script or a reference to a file in which the script or executable program is located.

As illustrated in FIG. 33, if the argument is an embedded script, the flow proceeds from test 515 to step 517 where the embedded script is directly executed by the remote agent on the data object, in this case "personnel." If the argument is a named script or an executable, the flow proceeds from test 515 to test 525 and then to step 526.

In step 526, the remote agent retrieves the program from the "script" portion 206 of the associated repository (FIG. 27A) at the particular remote node. For example, if the remote agent receives:

```
mpl(xyz.exe)
``` it then accesses a file referenced in the metadata containing the program to be executed, which maybe, for example, a "C" program, such as:

```
C:/program file/xyz.exe
``` or a URL address.

As reflected by tests 519, 527 and steps 523, 531 of FIG. 33, the results of execution of an MPL method are returned to the coordinating agent, where they are then merged with the results from the other nodes (servers) to create the overall result (this). The command, Client.write (this), returns this result to the client. Thus, the preferred embodiment permits the use of the metadata to determine whether and where the data object is distributed and then to run designated scripts or programs in parallel against the distributed data.

FIG. 32 further depicts implementation of the MPL command at decision point 507. The agent detects that an MPL command has been written because no data object is associated with the "mpl" script. In such case, the agent sends the pertinent script to the server or servers in question, where the remote agents execute them. The scripts or programs started at the remote nodes (servers) will run as independent scripts or programs and will not return results to the originating agent, as reflected by steps 521 and 529 of FIG. 33. Scripts or programs associated with MPL commands will typically include their own output commands.

In the following example, the[]remote agent at server 4 is instructed to 'strip_data,' a named script, while the remote agent at server 5 is instructed to run the named script, script, which was dynamically constructed in the preceding statements.

EXAMPLE

```
#local view script={ }
main ( ) {
    mpl('strip_data' ,4);
    script.write("#import Personnel          ");
    script.write("main ( ) {                 ");
    script.write("Personnel.search(          ");
    script.write("   if(state= = /"CA/");    ");
```

-continued

```
    script.write("                                     ");
    script.write("this.format(/"%s,%s/",               ");
    script.write("last_name, first_name) ;             ";
    script.write("this.print( ) ;                      ";
    script.write("}                                    ";
    script.close( );
    mpl(script,5);
} //main
```

Further details of additional methods, commands and controls implementable according to the preferred embodiment may be gleaned from the aforementioned co-pending U.S. patent application, Ser. No. 09/405,038 filed Sep. 24, 1999, incorporated by reference herein.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A method for executing methods upon data objects distributed across a plurality nodes of a system from a special device comprising the steps of:

providing a first graphical interface display on said special device permitting user selection a data object category, selection of such category resulting in display of a list of data objects available on the system;

responding to selection of a first of the data objects present in said list to generate a second graphical interface display on said special device of at least a portion of the contents of said first of the data objects together with a display of a plurality of selectable methods, each of said methods executable on said first data object; and responding to selection of one of said methods to execute that method upon the first data object and to display a first result of such execution on said special device.

2. The method of claim 1 wherein said user selection is achieved by a point and touch operation executed on the graphical interface display.

3. The method of claim 1 wherein a second method is executed on said first result to produce a second result.

4. The method of claim 3 wherein each of said methods comprises a transaction whereby a set of transactions are built up and executed by interacting with said display, with the results of each transaction being sequentially displayed, and becoming the basis for the next operation in the sequence of transactions.

5. The method of claim 1 wherein one said methods comprises an update of a record.

6. The method of claim 1 wherein one of said methods comprises a summation of records.

7. The method of claim 1 wherein one of said methods comprises selection of a record having a particular attribute.

8. The method of claim 7 wherein said attribute is minimum value.

9. The method of claim 3 wherein said second method comprises on update of a record.

10. The method of claim 3 wherein said second method comprises a summation of records.

11. The method of claim 3 wherein said second method comprises selection of a record having a particular attribute.

12. The method of claim 11 wherein said attribute is minimum value.

13. An apparatus for executing methods upon data objects distributed across a plurality of nodes of a system comprising:

a special device having a display associated therewith;

means providing a first graphical user interface on said display, said interface permitting user selection of a data object category, selection of such category resulting in display of a list of data objects available on the system;

means for responding to selection of a first of the data objects present in said list to generate a second graphical user interface on said special device of at least a portion of the contents of said first of the data objects together with a display of a plurality of selectable methods, each executable on said first data object; and means for responding to selection of one of said methods to execute that method upon the first data object and to display a first result of such execution on said special device.

* * * * *